United States Patent [19]
Leidig

[11] Patent Number: 5,934,779
[45] Date of Patent: Aug. 10, 1999

[54] REFLECTOR AND A REFLECTOR/LIGHT SOURCE SYSTEM

[75] Inventor: Carl Frederick Leidig, Rochester, N.Y.

[73] Assignee: Eastman Kodak Company, Rochester, N.Y.

[21] Appl. No.: 08/686,903

[22] Filed: Jul. 26, 1996

[51] Int. Cl.$^6$ ................................................. F21V 13/04
[52] U.S. Cl. ............................. 362/17; 362/16; 362/308; 362/309; 362/329; 362/343
[58] Field of Search ................................ 362/3, 16, 17, 362/18, 223, 289, 296, 297, 333, 342, 347, 308, 309, 329, 343

[56] References Cited

U.S. PATENT DOCUMENTS

| | | | |
|---|---|---|---|
| 1,577,352 | 3/1926 | Caughlan | 362/296 |
| 1,819,725 | 8/1931 | Wood | 362/296 |
| 2,277,685 | 3/1942 | Bergstrom | 362/297 |
| 3,179,898 | 4/1965 | Meltzer | 362/297 |
| 3,191,026 | 6/1965 | Perret | 362/296 |
| 4,041,344 | 8/1977 | LaGiusa | 362/296 |
| 4,081,277 | 3/1978 | Brault et al. | 96/38.2 |
| 4,683,525 | 7/1987 | Camm | 362/297 |
| 4,923,860 | 5/1990 | Simons | 503/227 |
| 4,933,817 | 6/1990 | Mochizuki et al. | 362/296 |
| 4,991,072 | 2/1991 | Malifaud | 362/297 |
| 5,055,976 | 10/1991 | Arai | 362/17 |
| 5,136,491 | 8/1992 | Kano | 362/347 |
| 5,160,192 | 11/1992 | Sugawara | 362/16 |
| 5,195,814 | 3/1993 | Hasushita et al. | 362/18 |
| 5,229,232 | 7/1993 | Longobardi et al. | 430/7 |
| 5,309,329 | 5/1994 | Theil et al. | 362/17 |
| 5,394,307 | 2/1995 | Matsuura | 362/16 |
| 5,408,363 | 4/1995 | Kano | 362/347 |
| 5,438,379 | 8/1995 | Kurematsu | 362/296 |
| 5,535,054 | 7/1996 | Shibuya | 362/296 |
| 5,584,572 | 12/1996 | Ishikawa | 362/297 |
| 5,586,013 | 12/1996 | Winston et al. | 362/347 |
| 5,617,163 | 4/1997 | Ohtake | 362/16 |
| 5,641,218 | 6/1997 | Sakurai | 362/16 |
| 5,749,642 | 5/1998 | Kimura et al. | 362/296 |
| 5,755,503 | 5/1998 | Chen et al. | 362/297 |

OTHER PUBLICATIONS

"The Optical Design of Reflectors" by William B. Elmer, Third Edition, Copyright 1989, by TLA Lightning Consultants, Inc., Salem, MA, pp. 42–48 and pp. 142–186.

*Primary Examiner*—Laura Tso
*Attorney, Agent, or Firm*—Svetlana Z. Short

[57] ABSTRACT

A reflector includes one closed end, one open end and highly reflecting curving walls. The walls are symmetrical about at least one axis of symmetry. The walls include a first segment and other segments. The first segment has a curved shape and is located at the closed end of the reflector. The first of segment directs most of the light rays incident on it across the axis of symmetry at crossover points, prior to the rays striking the associated target surface. Most of the light rays striking the walls of the first segment near the closed end of the reflector are having crossover points near the light source. Most of the light rays striking the walls of the first segment progressively further away from the closed end of the reflector are having crossover points located progressively closer to the associated target surface. The other segments direct nearly all of light rays incident on the walls of the other segments towards a portion of the associated surface. This portion of the associated surface is located on a side of the axis of symmetry where the light rays are incident on the walls of these other segments.

9 Claims, 10 Drawing Sheets

REFLECTOR AND A REFLECTOR/LIGHT SOURCE SYSTEM

CROSS REFERENCE TO RELATED APPLICATIONS

This application is related to U.S. patent application Ser. No. 08/938,172, filed Sep. 26, 1997, entitled FLASH DEVICE FOR DYE TRANSFERRING, Michael E. Long et al which is a divisional application of U.S. Ser. No. 08/686,906, filed Jul. 26, 1996.

BACKGROUND OF THE INVENTION

1. Field of the Invention

The present invention relates to reflectors, and reflector/light source systems suitable for use in flash devices or other devices requiring a uniform illumination of a target surface.

2. Background

Many devices require a reflector/light source system that (i) provides a uniform illumination of a target surface and (ii) has light rays striking the target surface at a relatively shallow angles and (iii) avoids a lamp interference problem. The lamp interference results when the light rays reflected off the reflector walls pass through the light source or its transparent envelope. This problem is described in the book entitled "The Optical Design of Reflectors" by William B. Elmer, Third Edition, Copyright 1989, by TLA Lightning Consultants, Inc. Salem, Mass., pgs. 178–179.

In theory, a parabolic reflector would provide a collimated light beam to uniformly illuminate a target surface located near the reflector opening, but only if the light source was a point light source located at the reflector's focal point, and only if the reflected light (but no direct light from the light source) reached the target surface. If a lamp of finite size was used as a light source, and the direct light from this lamp was blocked (as shown in FIG. 10), then from a shadow would be cast in the center a target plane. If the direct light from the lamp was not blocked the target plane would not be illuminated uniformly. Instead, the illumination of the target plane would be in the form of a bell-shaped curve, such as the one illustrated in FIG. 11.

Other reflectors have also been designed to provide relatively uniform illumination. Such reflectors are described in the above referenced book and are illustrated in FIG. 62 of this book. In evaluating the uniformity of the illumination the author of the book did not consider that the lamp also directly illuminates the target plane. The author, in his caption to FIG. 62 specifically stated that the contribution from "direct light [is] ignored)." If the direct light contribution to total illumination of the target plane is taken into account, the target plane is not illuminated uniformly.

This reference also teaches that hybrid and compound reflectors may be used to provide unusual beams of light. However, none of the hybrid reflectors disclosed and illustrated (see FIGS. 63 and 67) in this book are able to substantially avoid lamp interference problem while providing a uniform illumination of a target surface (when the direct light contribution to the overall target surface illumination is taken into account) and providing light rays that strike the target surface at a relatively shallow angles.

One promising reflector/light source combination for use in flash lamp devices is described in U.S. Pat. No. 5,309,329 by Thiel, et al., assigned to the Eastman Kodak Company. The reflector/light source combination described therein provides 90% or better illumination uniformity.

It is the principal object of the present invention to provide an alternative reflector device that achieves similar or higher illumination uniformity than the uniformity provided by the reflector/lamp combination disclosed in U.S. Pat. No. 5,309,329, that has light rays striking the target surface at a relatively shallow angles and, that greatly minimizes a lamp interference problem.

SUMMARY OF THE INVENTION

Briefly described, according to one aspect of the present invention, a reflector/light source system for illumination of an associated target area comprises a light source providing light defined as light rays and a reflector directing the light rays from the light source towards the associated target surface. The reflector includes one closed end, one open end and highly reflecting curving walls. The walls are symmetrical about at least one axis of symmetry. The walls include a first segment and other segments.

The first segment has a curved shape and is located at the closed end of the reflector. The first of segment directs most of the light rays incident on it across the axis of symmetry at crossover points, prior to the rays striking the associated target surface. Most of the light rays striking the walls of the first segment near the closed end of the reflector are having crossover points near the light source. Most of the light rays striking the walls of the first segment progressively further away from the closed end of the reflector are having crossover points located progressively closer to the associated target surface.

The other segments direct nearly all of light rays incident on the walls of the other segments towards a portion of the associated surface. This portion of the associated surface is located on a side of the axis of symmetry where the light rays are incident on the walls of these other segments.

According to a preferred embodiment of the present invention the reflective curving walls have at least one transition zone between the first segment and an adjacent one of the other segments. The transition zone reflects the light rays which will intersect the axis of symmetry in the space between the light source and the associated target surface.

According to a preferred embodiment of the present invention the light source is a flash lamp.

According to a preferred embodiment of the present invention the reflective inner walls of the reflector have a curvature that in cross-section having includes a vertex, said curvature having a cross-sectional shape which:

(1) Is partially contained within a portion of an ellipse so that by (a) a minor axis of the ellipse is equal to the maximum width between the inner walls and (b) a semi-major ellipse axis is equal to the reflector's vertex-to maximum width distance.

(2) From a vertex point to a point proximate to the widest part of the reflector, the shape is broader than a parabola. The parabola is defined by a curve which passes through (a) a vertex point which is a vertex point of the reflective inner walls and (b) symmetric points A. Points A are defined by an intersection of a plane with the reflective walls. This plane is perpendicular to the reflector's axis of symmetry and intersects the center of the flash lamp.

According to a preferred embodiment of the present invention a flash device for directing a high energy flash for transferring dye particles to a receiver element includes: a flash lamp providing a high energy flash of light; an above described reflector directing the light towards the receiver element; a support means for supporting the radiation-absorbing dye carrier between the reflector and receiver element; and a micro-optics array. The micro-optics array is located between the reflector and the radiation-absorbing dye carrier. It concentrates the light directed by the above described reflector on the radiation-absorbing dye carrier.

One of advantages of the present invention is that the reflector/flash lamp system achieves a substantially uniform (less than 10% variation) illumination on the target plane which located near the opened end of the reflector.

Overlapping the light rays from two sides of the walls of the first segment while keeping the light rays on the same side of the axis in other segment allows the light rays to mitigate any shadowing effect caused by the flash lamp and keeps the light rays striking the target surface at a relatively shallow angles. These shallow angles are equal to or are smaller than the angles of incidence (on the target surface) of the light rays directly emanating from the flash lamp.

BRIEF DESCRIPTION OF THE DRAWINGS

The foregoing and other objects, features and advantages as well as the presently preferred embodiment thereof will become more apparent from reading of the following description in connection with the accompanying drawings.

DESCRIPTION OF THE PREFERRED EMBODIMENT

The Reflector Shape

Figure 5:
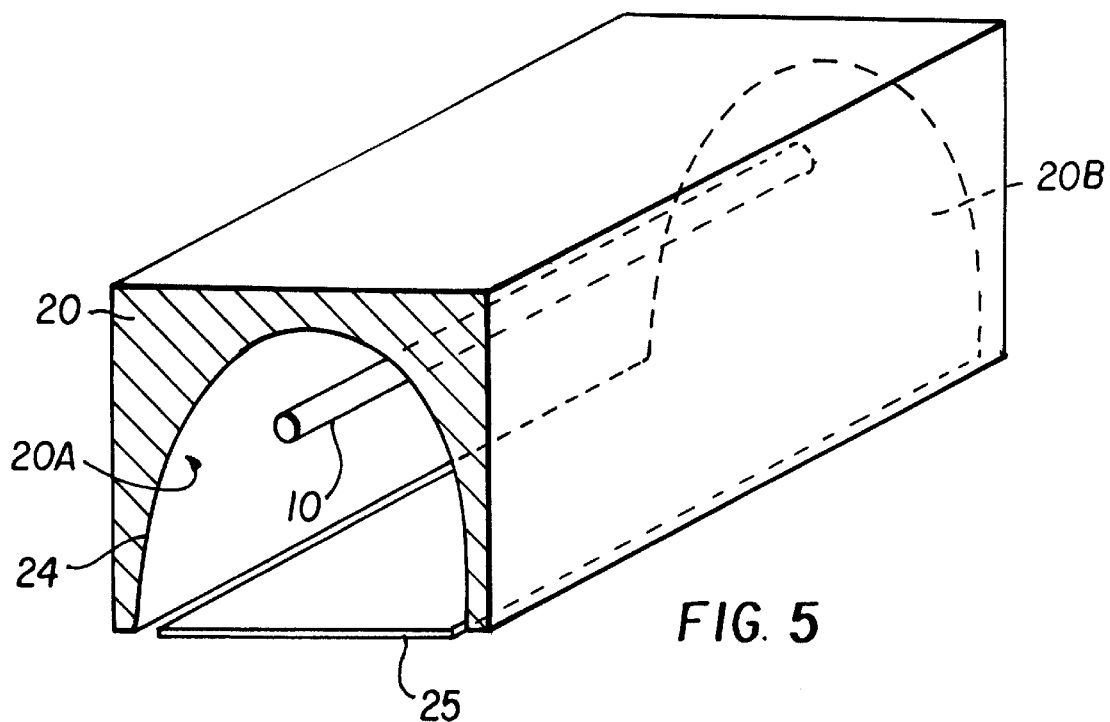
FIGS. 5 is a perspective view of the reflector 20, such as the one used in the flash device shown in FIG. 1.
Figure 5A:
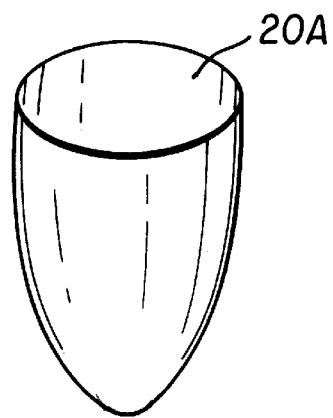
FIG. 5A is a perspective view of another reflector.

FIG. 5 shows a perspective view of the reflector 20 and the flash lamp 10. As stated above, the reflector 20 has highly reflective, curving inner walls 20A with an improved roughly egg-shaped cross-section 24. In a preferred embodiment of the invention, walls 20A are roughly cylindrical as shown in FIG. 5. The reflector 20 is also bounded by reflective side walls 20B which redirect the intercepted light (coming directly from the flash lamp 10 as well as reflected by the curved walls 20A) towards the transfer plane 25. Walls 20A do not have to be roughly cylindrical as shown in FIG. 5. They may alternatively have circular rather than linear symmetry, such that walls 20A are joined together into a continuous, cone-like shape as shown in FIG. 5A and side walls 20B are not required.

Figure 5B:
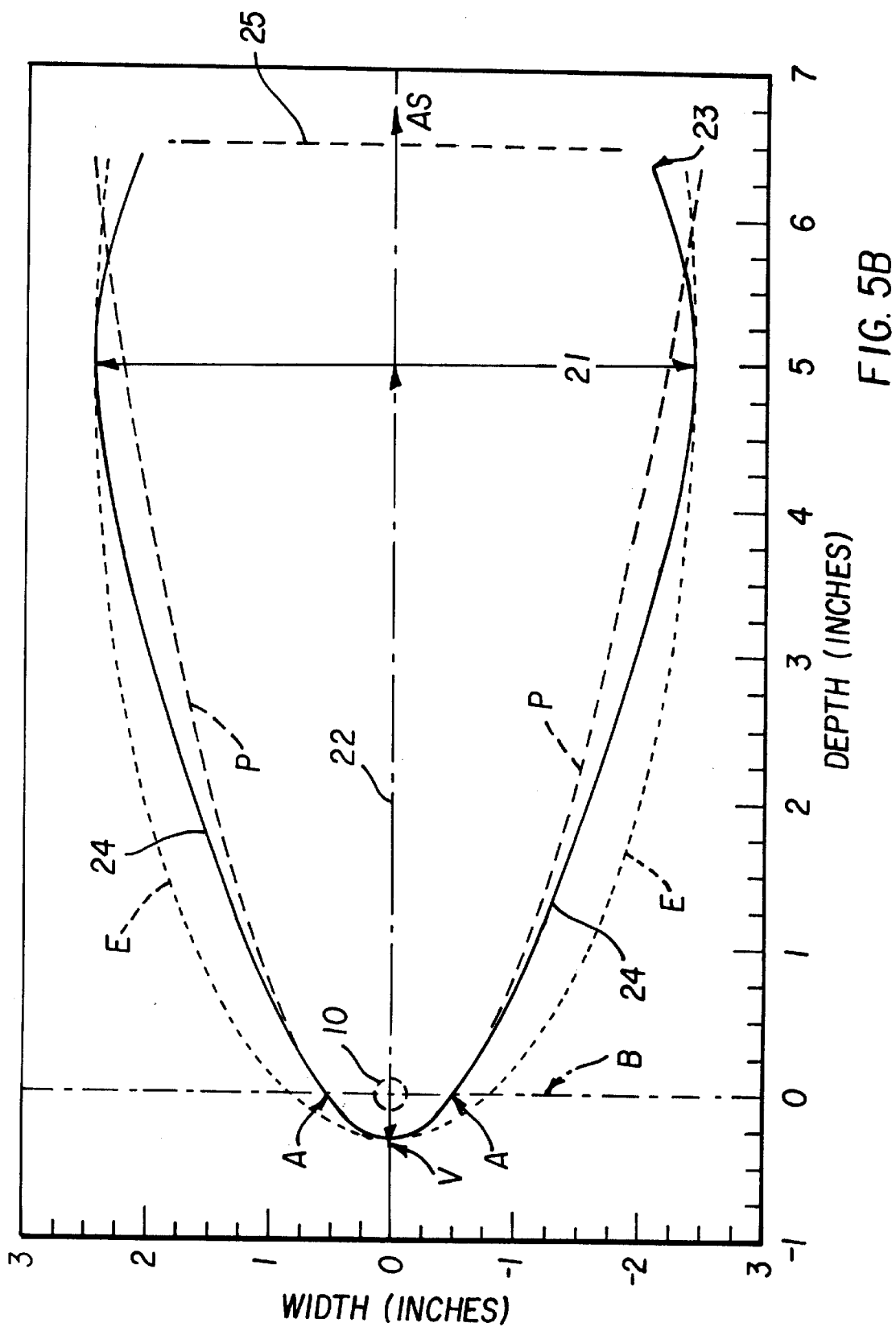
FIGS. 5B illustrates the cross-sectional shape of the curved reflector wall 20A of the reflector 20 shown in FIG. 5.

FIG. 5B shows a cross sectional view of the curved inner walls 20A of the reflector 20. The shape of the egg-like cross section 24 may be described as partially contained within the area bound by the ellipse E and a parabola P (up to just beyond the widest part or the reflector). The ellipse E is defined by setting the minor axis of the ellipse equal to the maximum width 21 between the reflector inner walls 20A and setting the semi-major ellipse axis equal to the reflector's vertex-to maximum width distance 22. The parabola P is defined by the curve passing through the vertex point of the reflector and points A. Points A are defined by the plane's B intersection with the inner wall surface 20A. (Plane B is perpendicular to the reflector's axis of symmetry AS and intersects the center of the flash lamp 10.) The reflector's opening 23 is smaller than its maximum width 21.

The reflector/flash lamp combination of the preferred embodiment described herein achieves a substantially uniform (less than 10% variation) illumination on the transfer plane 25 of approximately 2"×2" located close to the reflector's opening 23. Table 2 tabulates the intensity distribution across this plane 25, with the plane 25 being divided into 50 sections (a 10×5 matrix of sections of equal area). This intensity distribution is normalized, with the intensity having a value of 100 at the center of the transfer plane 25 (indicated in Table 2 by the dark line between numeric values at the center of the table).

The specific coordinates of some 600 points defining the reflector surface are provided in Table 1. The center of the flash lamp 10 defines the X=0.0, Y=0.0 point, as shown in FIG. 5C.

Figure 6A:
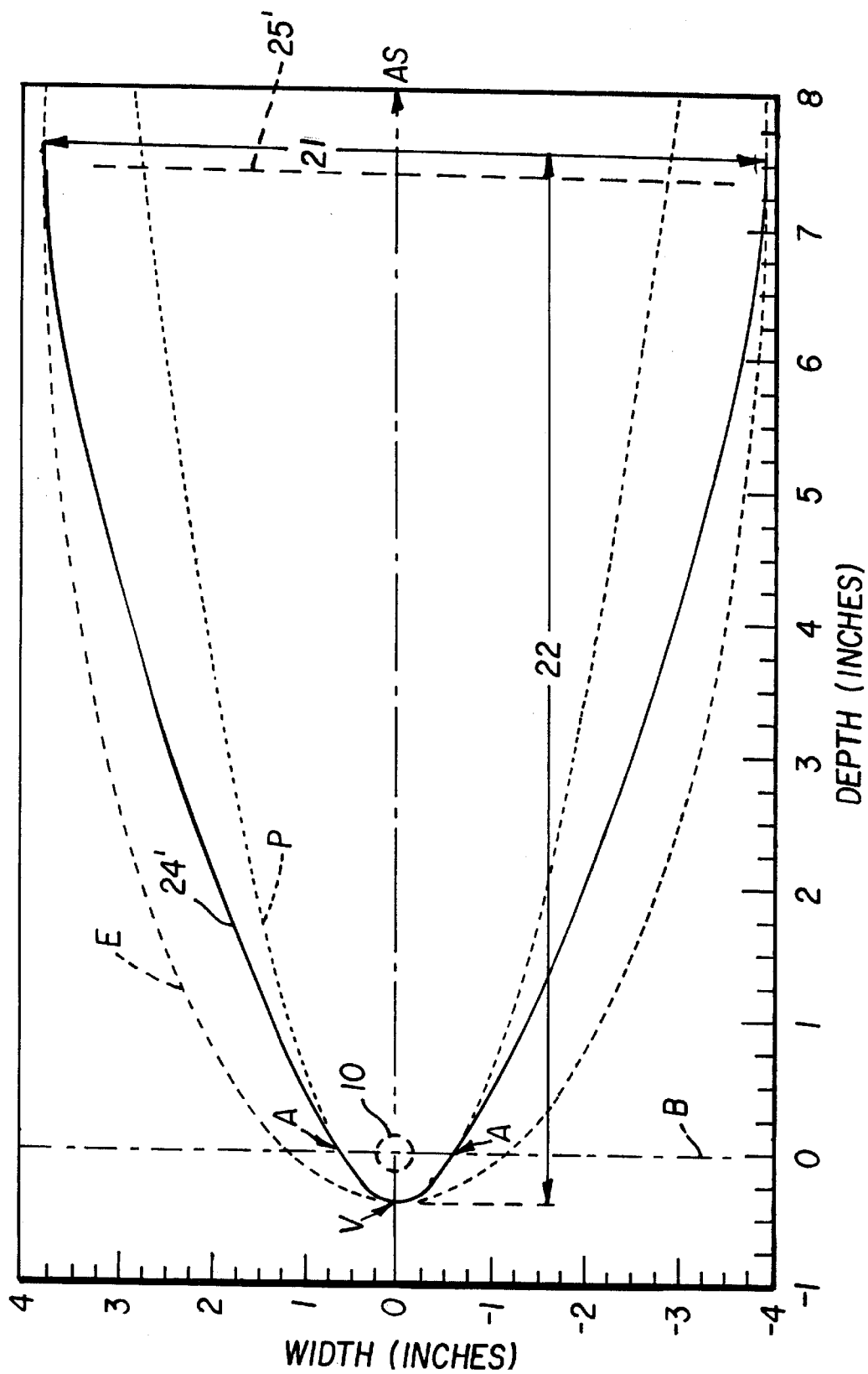
FIG. 6 illustrates an alternative cross-sectional shape of the curved reflector wall.
FIG. 6B illustrates another cross-sectional shape of the curved reflector wall.

FIG. 6 shows a cross-sectional view of an alternative reflector shape. The improved cross-section 24' provides substantially uniform (less than 5% variation) illumination on a transfer plane 25' of approximately 6"×6" located close to the reflector opening 23.

The shape of the cross-section 24' may also be described as being (1) partially contained within the value of the ellipse E defined by setting minor axis of the ellipse equal to the maximum width 21 of the reflector and setting the semi-major ellipse axis equal to the reflector's vertex-to maximum width distance 22; and (2) broader than a parabola P (up to just beyond the widest part of the reflector's inner wall 20A) defined by the parabola's vertex point which is the vertex point of the reflector inner wall surface and also points A as previously defined.

The specific coordinates of some 600 points defining the reflector surface are provided in Table 3. The center of the flash lamp 10 defines the X=0.0, Y=0.0 point, as shown in FIG. 6.

Table 4 tabulates the intensity distribution across the transfer plane 25', with the transfer plane 25' being divided into a plurality of sections (18 vertical and 11 horizontal). This intensity distribution is normalized, with the intensity having a value of 100 at the center of the plane 25'.

It is noted that the intensity values of Tables 2 and 4 do not account secondary reflections. Therefore the tabulated values at the extreme left and right columns of these tables are expected to be smaller than the actual intensity values produced at the edges of transfer planes 25 and 25'. Thus, the actual illumination of the transfer plane is expected to be more uniform than what is indicated by the values of Tables 2 and 4.

Figure 6B:
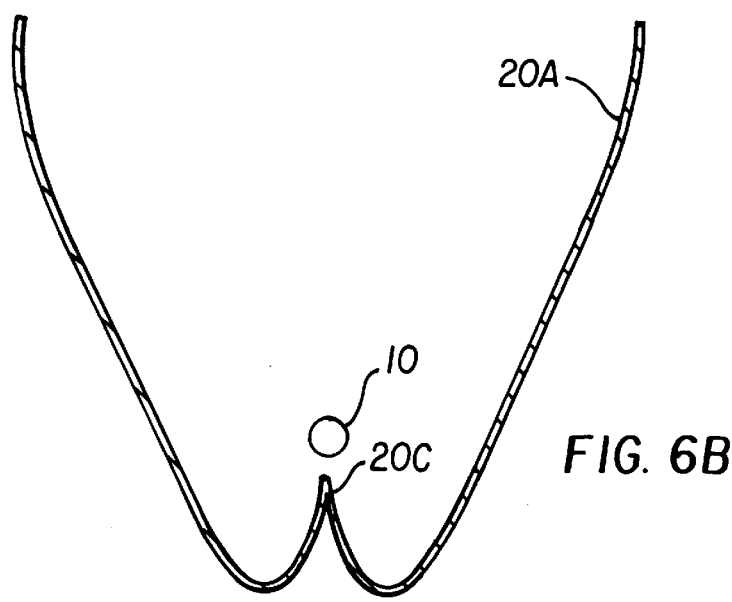

It is contemplated that some other reflector shapes may have curved inner walls 20A with a cusp 20C as shown in FIG. 6B. Such cross-sections, as well as both of the above described cross sections 24 and 24' can be described relative to their effect on the reflected light rays. That is, they may be defined by how the light rays incident on the reflective curved inner walls 20A are being directed, upon reflection, towards the transfer plane 25, 25'. This description is provided below.

Figure 7:
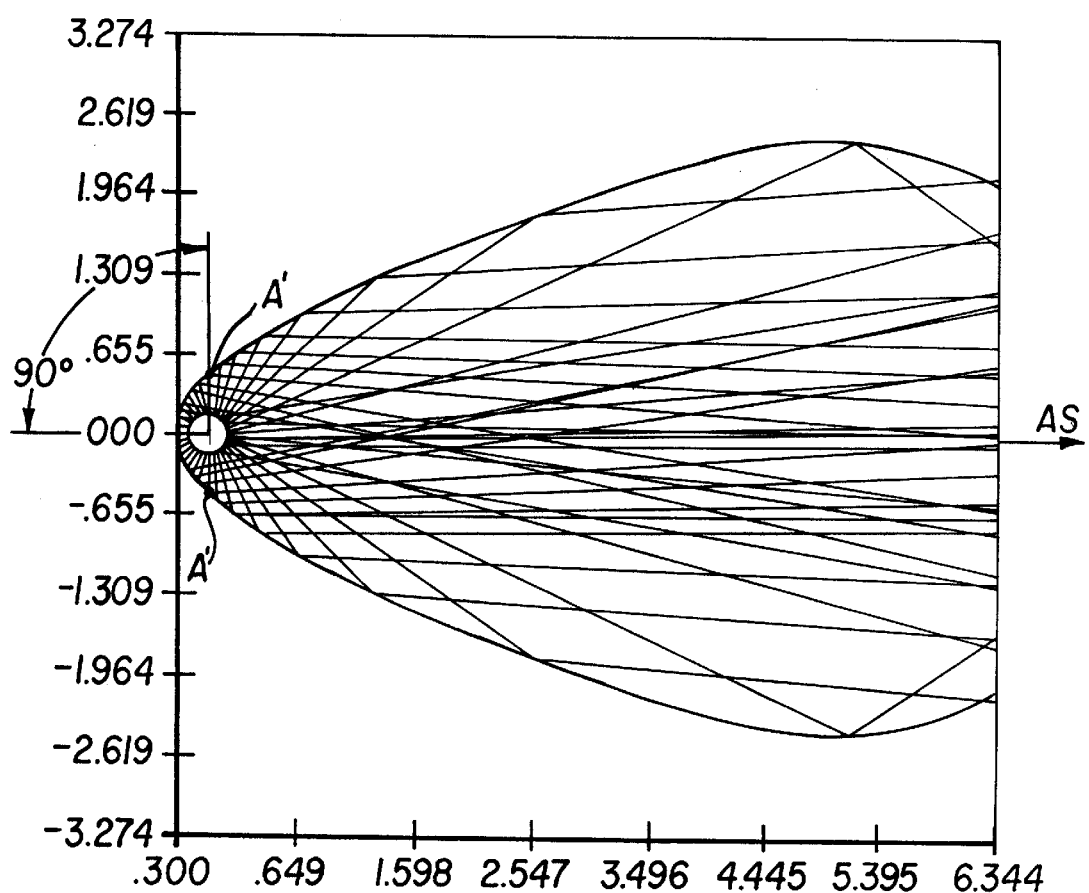
FIG. 7 depicts the light rays reflected by the curved inner walls of cross-sectional shape shown in FIG. 5B.
Figure 8A:
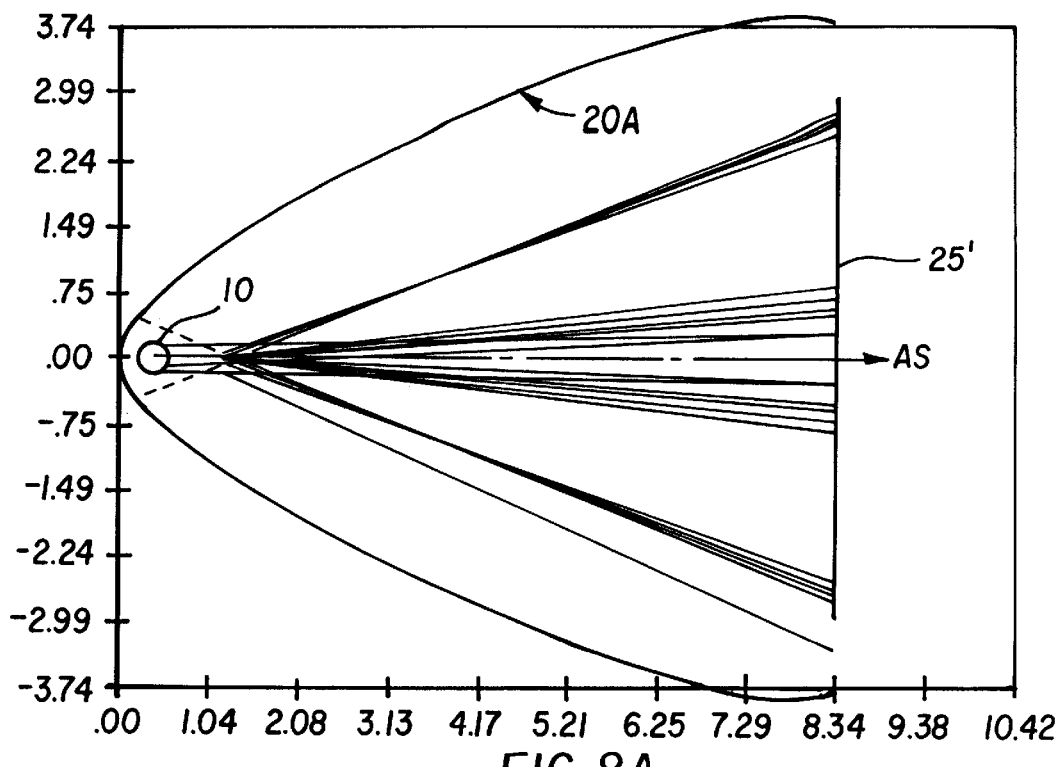
FIGS. 8A–8D depict the light rays reflected of the different segments of the curved inner walls of cross-sectional shape shown in FIG. 6.
Figure 8B:
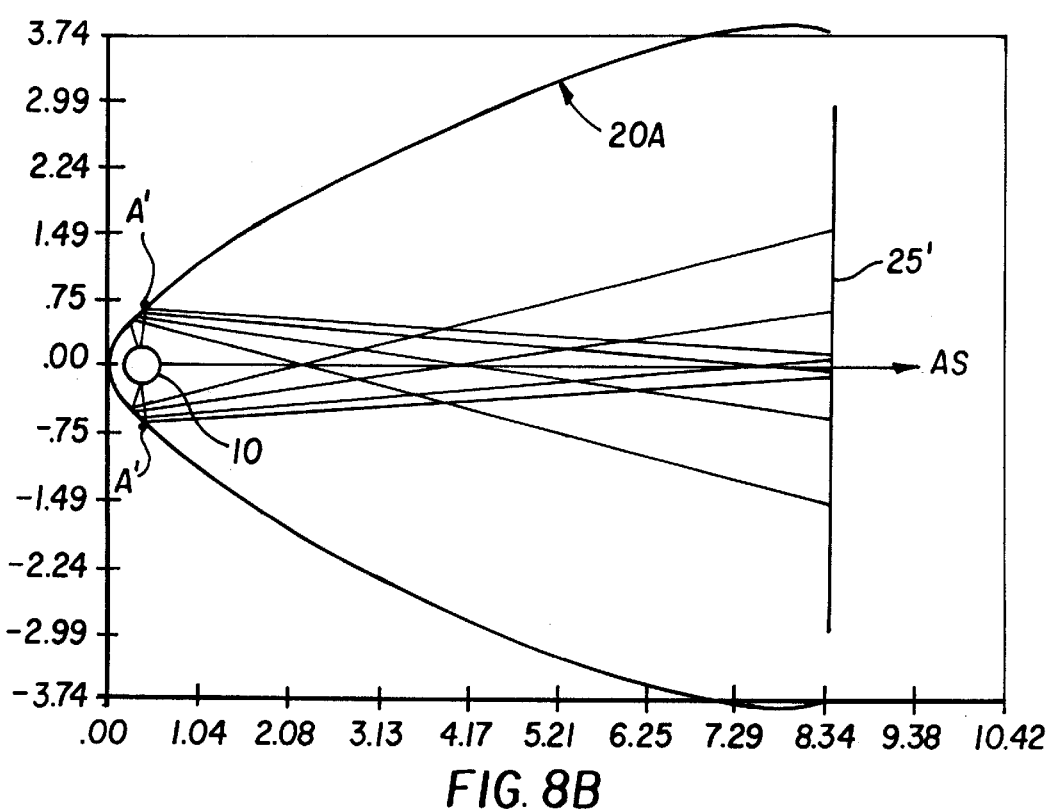
Figure 8C:
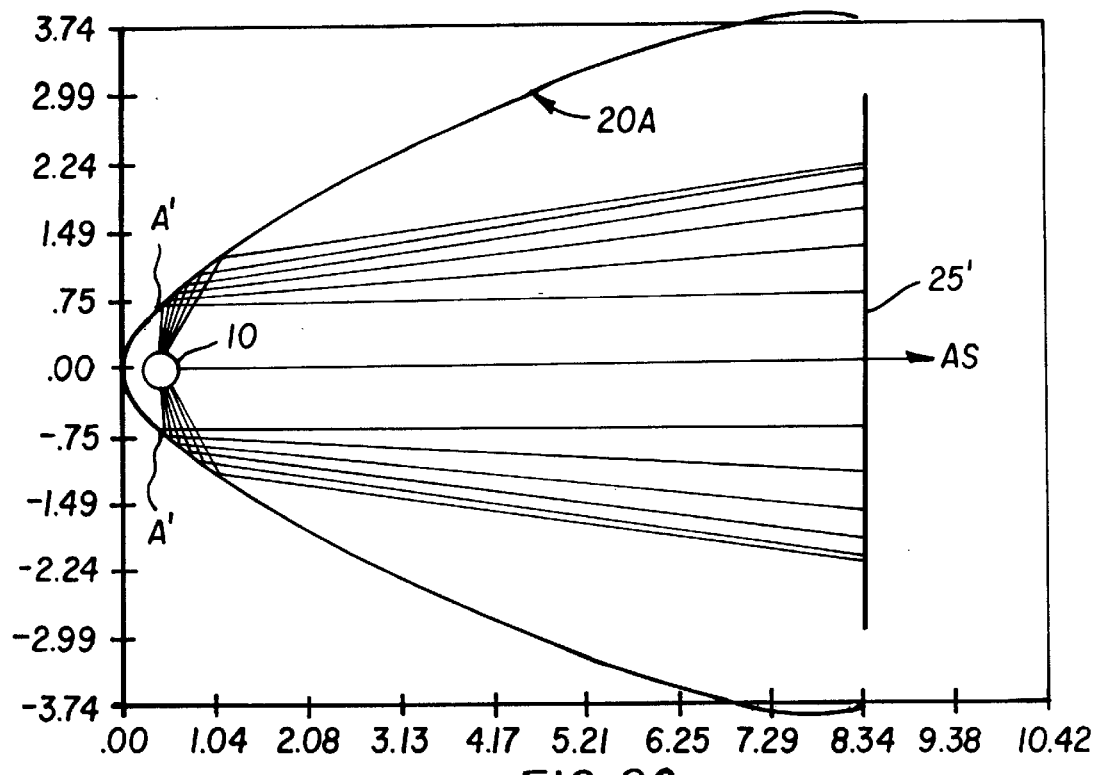
Figure 8D:
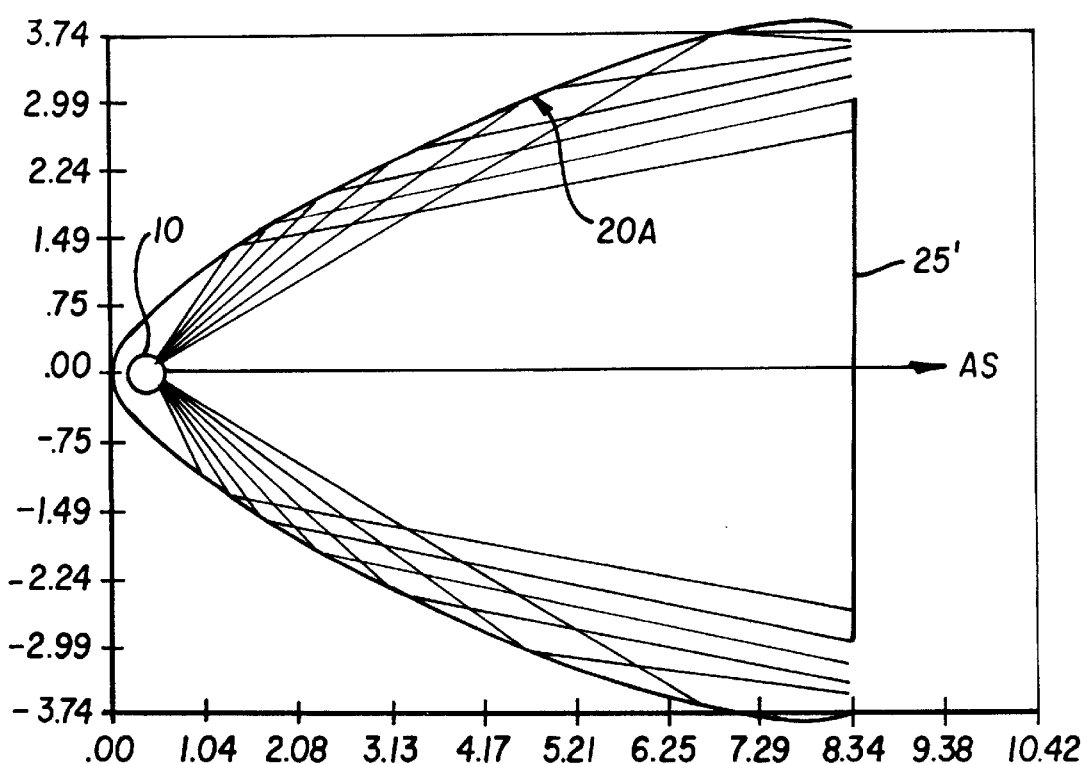

FIG. 7 illustrates the behavior of the light rays striking the reflective surface of cross-section 24. FIGS. 8A–8D illustrate the behavior of the light rays striking different segments of the reflective inner wall surface having the cross-section 24'. The cross-section 24, 24' is made of a plurality of reflective segments. Nearly all of the light rays reflected from the first reflective segment (0 to about 90°) are directed to cross the axis of symmetry AS before they reach the transfer plane 25, 25'. The light rays striking closest to the edge of this reflective segment (near point A') tend to strike this axis of symmetry AS closer to the transfer plane 25, 25', while the light rays striking closer to the vertex V of the cross-section tend to cross this axis of symmetry closer to the light source. (See FIG. 7 and FIGS. 8A and 8B). Nearly all of the light rays striking the reflector walls at the angles beyond about 90° strike the transfer plane on the same side of the axis of symmetry AS. (See FIG. 7 and FIGS. 8C and 8D). Thus, most of these light rays do not cross the axis of symmetry AS. Overlapping the light rays from two sides of the reflective inner walls of the first segment while keeping the light rays on the same side of the axis in the second segment, allows the light rays to mitigate any shadowing effect caused by the flash lamp 10 and keeps the light rays striking the transfer plane at a relatively shallow angles. These shallow angles are equal to or are smaller than the angles of incidence on the transfer plane of the light rays directly emanating from the flash lamp 10.

Figure 9:
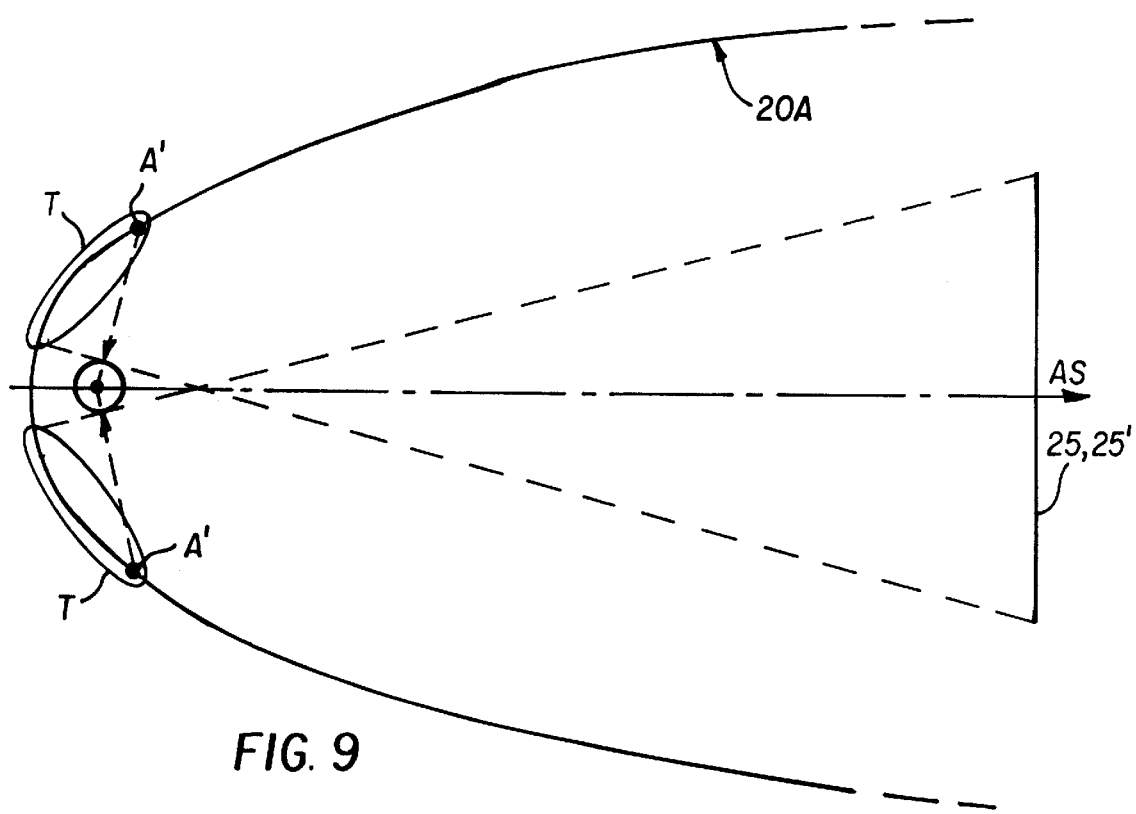
FIG. 9 depicts the location of a transition zone T between two segments of the curved inner walls 20A.
Figure 10:
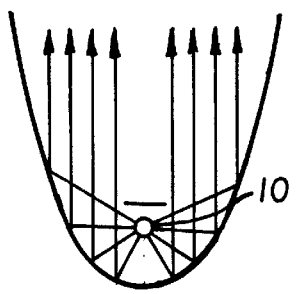
FIG. 10 shows a prior art parabolic reflector.
Figure 11:
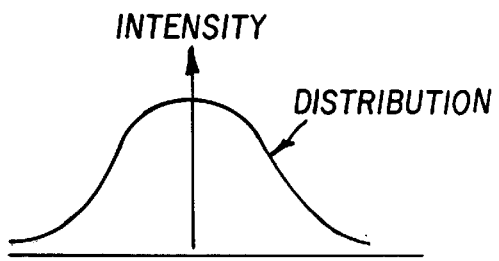
FIG. 11 shows a illumination distribution of a prior art parabolic reflector.
Figure 11:
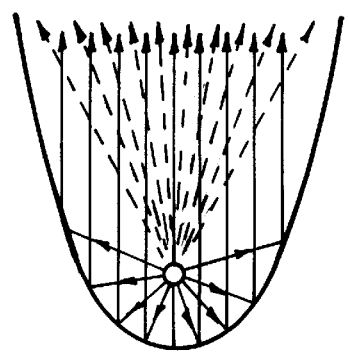

In the reflector embodiments previously discussed the transition zone T between the two reflective segments occurs near the point A which is located at about 90° angle to the axis of symmetry. This does not have to be so. The location of the transition zone T may occur in a place on the wall surface where when the light rays are reflected off the curved surface walls 20A towards the transfer plane 25, 25', the reflected rays will not intersect the light source. This is illustrated in FIG. 9. It is preferred that these reflected rays intersect the axis of symmetry AS in the space in front of the light source and behind the transfer plane.

TABLE 1

| Point # | X | Y | Point # | X | Y |
|---|---|---|---|---|---|
| 1 | −0.3 | 0 | 51 | −0.229983 | 0.252747 |
| 2 | −0.299974 | 0.005237 | 52 | −0.227495 | 0.257135 |
| 3 | −0.299887 | 0.010472 | 53 | −0.224955 | 0.261533 |
| 4 | −0.29974 | 0.015709 | 54 | −0.222363 | 0.265942 |
| 5 | −0.299532 | 0.020945 | 55 | −0.219718 | 0.270361 |
| 6 | −0.299264 | 0.026182 | 56 | −0.217019 | 0.274792 |
| 7 | −0.298936 | 0.031419 | 57 | −0.214265 | 0.279233 |
| 8 | −0.298547 | 0.036657 | 58 | −0.211456 | 0.283687 |
| 9 | −0.298099 | 0.041895 | 59 | −0.20859 | 0.288153 |
| 10 | −0.297591 | 0.047134 | 60 | −0.205667 | 0.292632 |
| 11 | −0.297023 | 0.052373 | 61 | −0.202686 | 0.297123 |
| 12 | −0.296395 | 0.057613 | 62 | −0.199646 | 0.301628 |
| 13 | −0.295707 | 0.062854 | 63 | −0.196545 | 0.306147 |
| 14 | −0.294959 | 0.068097 | 64 | −0.193384 | 0.310681 |
| 15 | −0.294152 | 0.07334 | 65 | −0.190161 | 0.315229 |
| 16 | −0.293284 | 0.078585 | 66 | −0.186874 | 0.319792 |
| 17 | −0.292356 | 0.083832 | 67 | −0.183523 | 0.324371 |
| 18 | −0.291369 | 0.08908 | 68 | −0.180537 | 0.328391 |
| 19 | −0.290321 | 0.094331 | 69 | −0.1775 | 0.332423 |
| 20 | −0.289212 | 0.099584 | 70 | −0.174412 | 0.336469 |
| 21 | −0.288043 | 0.104839 | 71 | −0.17127 | 0.340527 |
| 22 | −0.286813 | 0.110097 | 72 | −0.168076 | 0.3446 |
| 23 | −0.285522 | 0.115359 | 73 | −0.164826 | 0.348687 |
| 24 | −0.284169 | 0.120623 | 74 | −0.161522 | 0.352788 |
| 25 | −0.282755 | 0.125891 | 75 | −0.158161 | 0.356904 |
| 26 | −0.281279 | 0.131163 | 76 | −0.154743 | 0.361035 |
| 27 | −0.279741 | 0.136439 | 77 | −0.151266 | 0.365181 |
| 28 | −0.27814 | 0.14172 | 78 | −0.14773 | 0.369344 |
| 29 | −0.276477 | 0.147006 | 79 | −0.144134 | 0.373523 |
| 30 | −0.274925 | 0.151767 | 80 | −0.140476 | 0.377718 |
| 31 | −0.273322 | 0.156533 | 81 | −0.136755 | 0.381931 |
| 32 | −0.271667 | 0.161304 | 82 | −0.132977 | 0.386183 |
| 33 | −0.269959 | 0.16608 | 83 | −0.129147 | 0.390492 |
| 34 | −0.268198 | 0.170862 | 84 | −0.125819 | 0.394231 |
| 35 | −0.266384 | 0.175649 | 85 | −0.122449 | 0.398012 |
| 36 | −0.264517 | 0.180442 | 86 | −0.119034 | 0.401837 |
| 37 | −0.262595 | 0.185241 | 87 | −0.115573 | 0.405706 |
| 38 | −0.260619 | 0.190047 | 88 | −0.112064 | 0.409621 |
| 39 | −0.258587 | 0.194859 | 89 | −0.108505 | 0.41358 |
| 40 | −0.2565 | 0.19968 | 90 | −0.104895 | 0.417586 |
| 41 | −0.254356 | 0.204508 | 91 | −0.101231 | 0.421638 |
| 42 | −0.252156 | 0.209343 | 92 | −0.097512 | 0.425737 |
| 43 | −0.249898 | 0.214188 | 93 | −0.093735 | 0.429884 |
| 44 | −0.247581 | 0.219041 | 94 | −0.089898 | 0.434079 |
| 45 | −0.245206 | 0.223903 | 95 | −0.086 | 0.438322 |
| 46 | −0.242771 | 0.228775 | 96 | −0.082039 | 0.442613 |
| 47 | −0.240276 | 0.233657 | 97 | −0.078011 | 0.446954 |
| 48 | −0.23772 | 0.23855 | 98 | −0.073916 | 0.451343 |
| 49 | −0.235101 | 0.243453 | 99 | −0.070449 | 0.455039 |
| 50 | −0.23242 | 0.248368 | 100 | −0.066933 | 0.458769 |
| 101 | −0.063365 | 0.462533 | 151 | 0.146856 | 0.651704 |
| 102 | −0.059744 | 0.466332 | 152 | 0.15124 | 0.655144 |
| 103 | −0.05607 | 0.470166 | 153 | 0.155676 | 0.658608 |
| 104 | −0.05234 | 0.474034 | 154 | 0.160165 | 0.662095 |
| 105 | −0.048553 | 0.477936 | 155 | 0.164708 | 0.665606 |
| 106 | −0.044708 | 0.481873 | 156 | 0.169306 | 0.669142 |
| 107 | −0.040804 | 0.485844 | 157 | 0.173959 | 0.672701 |
| 108 | −0.036838 | 0.489848 | 158 | 0.178669 | 0.676285 |
| 109 | −0.03281 | 0.493887 | 159 | 0.183436 | 0.679893 |
| 110 | −0.028719 | 0.497959 | 160 | 0.188261 | 0.683526 |
| 111 | −0.024562 | 0.502064 | 161 | 0.193145 | 0.687183 |
| 112 | −0.020338 | 0.506203 | 162 | 0.198089 | 0.690865 |
| 113 | −0.016046 | 0.510373 | 163 | 0.203093 | 0.694572 |
| 114 | −0.011684 | 0.514577 | 164 | 0.20816 | 0.698304 |
| 115 | −0.007252 | 0.518811 | 165 | 0.213288 | 0.702061 |
| 116 | −0.002746 | 0.523077 | 166 | 0.218481 | 0.705844 |
| 117 | 0.000912 | 0.526512 | 167 | 0.223738 | 0.709651 |
| 118 | 0.004618 | 0.529969 | 168 | 0.22906 | 0.713484 |
| 119 | 0.008373 | 0.533454 | 169 | 0.234449 | 0.717343 |
| 120 | 0.012178 | 0.536971 | 170 | 0.239905 | 0.721227 |
| 121 | 0.016034 | 0.540518 | 171 | 0.24543 | 0.725137 |
| 122 | 0.019943 | 0.544097 | 172 | 0.251024 | 0.729072 |
| 123 | 0.023905 | 0.547708 | 173 | 0.256689 | 0.733034 |
| 124 | 0.027922 | 0.551351 | 174 | 0.262425 | 0.737021 |
| 125 | 0.031994 | 0.555026 | 175 | 0.268234 | 0.741034 |
| 126 | 0.036123 | 0.558734 | 176 | 0.274117 | 0.745073 |
| 127 | 0.04031 | 0.562476 | 177 | 0.280076 | 0.749141 |
| 128 | 0.044556 | 0.566251 | 178 | 0.286115 | 0.753248 |
| 129 | 0.048863 | 0.57006 | 179 | 0.292236 | 0.757392 |
| 130 | 0.053231 | 0.573904 | 180 | 0.298441 | 0.761575 |
| 131 | 0.057661 | 0.577783 | 181 | 0.302624 | 0.764385 |
| 132 | 0.062156 | 0.581697 | 182 | 0.306846 | 0.767213 |
| 133 | 0.066717 | 0.585646 | 183 | 0.311106 | 0.770059 |
| 134 | 0.071344 | 0.589632 | 184 | 0.315406 | 0.772924 |

TABLE 1-continued

| Point # | X | Y | Point # | X | Y |
|---|---|---|---|---|---|
| 135 | 0.076039 | 0.593654 | 185 | 0.319746 | 0.775806 |
| 136 | 0.080804 | 0.597713 | 186 | 0.324126 | 0.778707 |
| 137 | 0.08564 | 0.601808 | 187 | 0.328547 | 0.781627 |
| 138 | 0.090549 | 0.605942 | 188 | 0.33301 | 0.784565 |
| 139 | 0.095531 | 0.610113 | 189 | 0.337514 | 0.787523 |
| 140 | 0.100589 | 0.614323 | 190 | 0.342061 | 0.7905 |
| 141 | 0.105724 | 0.618571 | 191 | 0.346651 | 0.793497 |
| 142 | 0.109626 | 0.621783 | 192 | 0.351285 | 0.796513 |
| 143 | 0.113574 | 0.625017 | 193 | 0.355963 | 0.79955 |
| 144 | 0.117567 | 0.628273 | 194 | 0.360686 | 0.802607 |
| 145 | 0.121607 | 0.631552 | 195 | 0.365455 | 0.805684 |
| 146 | 0.125693 | 0.634853 | 196 | 0.370269 | 0.808782 |
| 147 | 0.129827 | 0.638177 | 197 | 0.375131 | 0.811901 |
| 148 | 0.13401 | 0.641524 | 198 | 0.38004 | 0.815042 |
| 149 | 0.138242 | 0.644894 | 199 | 0.384997 | 0.818204 |
| 150 | 0.142523 | 0.648288 | 200 | 0.390002 | 0.821387 |
| 201 | 0.395058 | 0.824593 | 251 | 0.730257 | 1.020063 |
| 202 | 0.400163 | 0.827821 | 252 | 0.73467 | 1.022453 |
| 203 | 0.405319 | 0.831071 | 253 | 0.739111 | 1.024853 |
| 204 | 0.410527 | 0.834345 | 254 | 0.743579 | 1.027264 |
| 205 | 0.415787 | 0.837641 | 255 | 0.748074 | 1.029686 |
| 206 | 0.4211 | 0.840961 | 256 | 0.752597 | 1.032119 |
| 207 | 0.426466 | 0.844304 | 257 | 0.757148 | 1.034563 |
| 208 | 0.431888 | 0.847672 | 258 | 0.761728 | 1.037018 |
| 209 | 0.437364 | 0.851063 | 259 | 0.766336 | 1.039484 |
| 210 | 0.442897 | 0.854479 | 260 | 0.770973 | 1.041962 |
| 211 | 0.448487 | 0.857921 | 261 | 0.775639 | 1.04445 |
| 212 | 0.454134 | 0.861386 | 262 | 0.780334 | 1.046951 |
| 213 | 0.45984 | 0.864878 | 263 | 0.785059 | 1.049462 |
| 214 | 0.465606 | 0.868396 | 264 | 0.789813 | 1.051985 |
| 215 | 0.471431 | 0.871939 | 265 | 0.794599 | 1.05452 |
| 216 | 0.477318 | 0.875509 | 266 | 0.799414 | 1.057067 |
| 217 | 0.483268 | 0.879105 | 267 | 0.804259 | 1.059625 |
| 218 | 0.489279 | 0.882727 | 268 | 0.809136 | 1.062196 |
| 219 | 0.495356 | 0.88638 | 269 | 0.814044 | 1.064778 |
| 220 | 0.501497 | 0.890059 | 270 | 0.818983 | 1.067372 |
| 221 | 0.507704 | 0.893766 | 271 | 0.823954 | 1.069979 |
| 222 | 0.513978 | 0.897501 | 272 | 0.828957 | 1.072598 |
| 223 | 0.52032 | 0.901266 | 273 | 0.833991 | 1.075229 |
| 224 | 0.52673 | 0.905059 | 274 | 0.839059 | 1.077873 |
| 225 | 0.533211 | 0.908882 | 275 | 0.84416 | 1.080529 |
| 226 | 0.539763 | 0.912735 | 276 | 0.849293 | 1.083198 |
| 227 | 0.546387 | 0.916619 | 277 | 0.854461 | 1.085879 |
| 228 | 0.553084 | 0.920533 | 278 | 0.859662 | 1.088574 |
| 229 | 0.559856 | 0.924478 | 279 | 0.864897 | 1.091282 |
| 230 | 0.566703 | 0.928455 | 280 | 0.870166 | 1.094002 |
| 231 | 0.573627 | 0.932464 | 281 | 0.87547 | 1.096736 |
| 232 | 0.580629 | 0.936505 | 282 | 0.880809 | 1.099482 |
| 233 | 0.58771 | 0.94058 | 283 | 0.886183 | 1.102242 |
| 234 | 0.594871 | 0.944687 | 284 | 0.891593 | 1.105016 |
| 235 | 0.602114 | 0.948828 | 285 | 0.897038 | 1.107803 |
| 236 | 0.609441 | 0.953003 | 286 | 0.90252 | 1.110603 |
| 237 | 0.616851 | 0.957213 | 287 | 0.908039 | 1.113418 |
| 238 | 0.624347 | 0.961458 | 288 | 0.913594 | 1.116246 |
| 239 | 0.63193 | 0.965739 | 289 | 0.919187 | 1.119088 |
| 240 | 0.639602 | 0.970056 | 290 | 0.924817 | 1.121944 |
| 241 | 0.647363 | 0.974409 | 291 | 0.930485 | 1.124814 |
| 242 | 0.655216 | 0.978799 | 292 | 0.93619 | 1.127698 |
| 243 | 0.663162 | 0.983227 | 293 | 0.941935 | 1.130597 |
| 244 | 0.671201 | 0.987692 | 294 | 0.947718 | 1.13351 |
| 245 | 0.679337 | 0.992197 | 295 | 0.953541 | 1.136437 |
| 246 | 0.687571 | 0.99674 | 296 | 0.959404 | 1.13938 |
| 247 | 0.695903 | 1.001323 | 297 | 0.965307 | 1.142337 |
| 248 | 0.704336 | 1.005947 | 298 | 0.97125 | 1.145309 |
| 249 | 0.712872 | 1.010611 | 299 | 0.977233 | 1.148296 |
| 250 | 0.721511 | 1.015316 | 300 | 0.983258 | 1.151298 |
| 301 | 0.989324 | 1.154315 | 351 | 1.355551 | 1.327496 |
| 302 | 0.995433 | 1.157348 | 352 | 1.364366 | 1.331472 |
| 303 | 1.001584 | 1.160396 | 353 | 1.373251 | 1.335471 |
| 304 | 1.007777 | 1.163459 | 354 | 1.382206 | 1.339493 |
| 305 | 1.014014 | 1.166539 | 355 | 1.39123 | 1.343538 |
| 306 | 1.020294 | 1.169634 | 356 | 1.400327 | 1.347607 |
| 307 | 1.026618 | 1.172745 | 357 | 1.409495 | 1.351699 |
| 308 | 1.032986 | 1.175872 | 358 | 1.418737 | 1.355816 |
| 309 | 1.039399 | 1.179016 | 359 | 1.428052 | 1.359957 |
| 310 | 1.045857 | 1.182175 | 360 | 1.437441 | 1.364122 |
| 311 | 1.052361 | 1.185351 | 361 | 1.446906 | 1.368312 |
| 312 | 1.058911 | 1.188544 | 362 | 1.456446 | 1.372527 |
| 313 | 1.065507 | 1.191754 | 363 | 1.466063 | 1.376766 |
| 314 | 1.072151 | 1.19498 | 364 | 1.475757 | 1.38103 |
| 315 | 1.078842 | 1.198223 | 365 | 1.48553 | 1.38532 |
| 316 | 1.08558 | 1.201483 | 366 | 1.495382 | 1.389636 |
| 317 | 1.092367 | 1.204761 | 367 | 1.505315 | 1.393977 |
| 318 | 1.099203 | 1.208056 | 368 | 1.515328 | 1.398345 |
| 319 | 1.106087 | 1.211368 | 369 | 1.525423 | 1.402738 |
| 320 | 1.113022 | 1.214698 | 370 | 1.535601 | 1.407159 |
| 321 | 1.120007 | 1.218046 | 371 | 1.545862 | 1.411606 |
| 322 | 1.127043 | 1.221412 | 372 | 1.556208 | 1.416079 |
| 323 | 1.13413 | 1.224796 | 373 | 1.566637 | 1.42058 |
| 324 | 1.141268 | 1.228198 | 374 | 1.577155 | 1.425108 |
| 325 | 1.148459 | 1.231618 | 375 | 1.587759 | 1.429664 |
| 326 | 1.155703 | 1.235057 | 376 | 1.598452 | 1.434248 |
| 327 | 1.163 | 1.238515 | 377 | 1.609233 | 1.438859 |
| 328 | 1.170349 | 1.241991 | 378 | 1.620105 | 1.443499 |
| 329 | 1.177754 | 1.245486 | 379 | 1.631068 | 1.448168 |
| 330 | 1.185213 | 1.249 | 380 | 1.642122 | 1.452865 |
| 331 | 1.192728 | 1.252534 | 381 | 1.65327 | 1.457591 |
| 332 | 1.200299 | 1.256087 | 382 | 1.66451 | 1.462346 |
| 333 | 1.207926 | 1.25966 | 383 | 1.675847 | 1.467131 |
| 334 | 1.215611 | 1.263252 | 384 | 1.68728 | 1.471946 |
| 335 | 1.223353 | 1.266864 | 385 | 1.69881 | 1.47679 |
| 336 | 1.231153 | 1.270496 | 386 | 1.710438 | 1.481665 |
| 337 | 1.239011 | 1.274148 | 387 | 1.722165 | 1.48657 |
| 338 | 1.246929 | 1.277821 | 388 | 1.733993 | 1.491506 |
| 339 | 1.254908 | 1.281514 | 389 | 1.745923 | 1.496473 |
| 340 | 1.262947 | 1.285228 | 390 | 1.757953 | 1.501471 |
| 341 | 1.271047 | 1.288963 | 391 | 1.770089 | 1.506501 |
| 342 | 1.279208 | 1.292719 | 392 | 1.78233 | 1.511562 |
| 343 | 1.287433 | 1.296496 | 393 | 1.794677 | 1.516656 |
| 344 | 1.29572 | 1.300295 | 394 | 1.807132 | 1.521782 |
| 345 | 1.304071 | 1.304114 | 395 | 1.819694 | 1.52694 |
| 346 | 1.312485 | 1.307956 | 396 | 1.832367 | 1.532132 |
| 347 | 1.320966 | 1.311819 | 397 | 1.84515 | 1.537356 |
| 348 | 1.329512 | 1.315705 | 398 | 1.858045 | 1.542614 |
| 349 | 1.338124 | 1.319613 | 399 | 1.871053 | 1.547904 |
| 350 | 1.346804 | 1.323543 | 400 | 1.884176 | 1.55323 |
| 401 | 1.897416 | 1.558589 | 451 | 2.741055 | 1.876862 |
| 402 | 1.910773 | 1.563984 | 452 | 2.762354 | 1.884372 |
| 403 | 1.924248 | 1.569413 | 453 | 2.78386 | 1.891931 |
| 404 | 1.937844 | 1.574877 | 454 | 2.80558 | 1.899542 |
| 405 | 1.95156 | 1.580376 | 455 | 2.827515 | 1.907204 |
| 406 | 1.9654 | 1.585911 | 456 | 2.849666 | 1.914917 |
| 407 | 1.979363 | 1.591482 | 457 | 2.872037 | 1.922681 |
| 408 | 1.993451 | 1.597088 | 458 | 2.894629 | 1.930497 |
| 409 | 2.007667 | 1.602732 | 459 | 2.917445 | 1.938365 |
| 410 | 2.022011 | 1.608413 | 460 | 2.940488 | 1.946285 |
| 411 | 2.036485 | 1.614131 | 461 | 2.96376 | 1.954258 |
| 412 | 2.05109 | 1.619886 | 462 | 2.98726 | 1.962282 |
| 413 | 2.065828 | 1.625679 | 463 | 3.010998 | 1.97036 |
| 414 | 2.080701 | 1.631509 | 464 | 3.034972 | 1.978492 |
| 415 | 2.095709 | 1.637379 | 465 | 3.059186 | 1.986676 |
| 416 | 2.110855 | 1.643286 | 466 | 3.083642 | 1.994915 |
| 417 | 2.126137 | 1.649232 | 467 | 3.108342 | 2.003296 |
| 418 | 2.141562 | 1.655218 | 468 | 3.13329 | 2.011553 |
| 419 | 2.157129 | 1.661244 | 469 | 3.158488 | 2.019953 |
| 420 | 2.17284 | 1.66731 | 470 | 3.183938 | 2.028407 |
| 421 | 2.188697 | 1.673415 | 471 | 3.20964 | 2.036915 |
| 422 | 2.2047 | 1.679561 | 472 | 3.235603 | 2.045478 |
| 423 | 2.220853 | 1.685748 | 473 | 3.261827 | 2.054096 |
| 424 | 2.237156 | 1.691977 | 474 | 3.288314 | 2.062769 |
| 425 | 2.253611 | 1.698246 | 475 | 3.315067 | 2.071497 |
| 426 | 2.270218 | 1.704557 | 476 | 3.342089 | 2.08028 |
| 427 | 2.286983 | 1.710911 | 477 | 3.369382 | 2.089118 |
| 428 | 2.303905 | 1.717307 | 478 | 3.39695 | 2.098011 |
| 429 | 2.320987 | 1.723745 | 479 | 3.424795 | 2.106959 |
| 430 | 2.33823 | 1.730227 | 480 | 3.452916 | 2.115962 |
| 431 | 2.355636 | 1.736753 | 481 | 3.481324 | 2.125021 |
| 432 | 2.373208 | 1.743322 | 482 | 3.510016 | 2.134134 |
| 433 | 2.390946 | 1.749935 | 483 | 3.538997 | 2.143303 |
| 434 | 2.408852 | 1.756592 | 484 | 3.56827 | 2.152528 |
| 435 | 2.426928 | 1.763293 | 485 | 3.597835 | 2.161807 |
| 436 | 2.445178 | 1.77004 | 486 | 3.627697 | 2.17114 |
| 437 | 2.463603 | 1.776833 | 487 | 3.657858 | 2.180529 |
| 438 | 2.482204 | 1.783671 | 488 | 3.688321 | 2.189972 |

TABLE 1-continued

| Point # | X | Y | Point # | X | Y |
|---|---|---|---|---|---|
| 439 | 2.500984 | 1.790555 | 489 | 3.719084 | 2.199468 |
| 440 | 2.519945 | 1.797485 | 490 | 3.750158 | 2.209019 |
| 441 | 2.539089 | 1.804462 | 491 | 3.781542 | 2.218624 |
| 442 | 2.558418 | 1.811486 | 492 | 3.813239 | 2.228283 |
| 443 | 2.577934 | 1.818557 | 493 | 3.845252 | 2.237995 |
| 444 | 2.597636 | 1.825674 | 494 | 3.877581 | 2.24776 |
| 445 | 2.617533 | 1.832841 | 495 | 3.910231 | 2.257577 |
| 446 | 2.637623 | 1.840055 | 496 | 3.943204 | 2.267446 |
| 447 | 2.657909 | 1.847318 | 497 | 3.976502 | 2.277367 |
| 448 | 2.678393 | 1.85463 | 498 | 4.010044 | 2.287292 |
| 449 | 2.699077 | 1.861991 | 499 | 4.043145 | 2.296829 |
| 450 | 2.719964 | 1.869402 | 500 | 4.07581 | 2.305984 |
| 501 | 4.108044 | 2.314765 | 551 | 5.328383 | 2.41703 |
| 502 | 4.139857 | 2.32318 | 552 | 5.347558 | 2.414482 |
| 503 | 4.171256 | 2.331236 | 553 | 5.366606 | 2.411814 |
| 504 | 4.202249 | 2.338941 | 554 | 5.38553 | 2.409029 |
| 505 | 4.232843 | 2.346302 | 555 | 5.404334 | 2.406129 |
| 506 | 4.263047 | 2.353326 | 556 | 5.42302 | 2.403115 |
| 507 | 4.292863 | 2.360019 | 557 | 5.441592 | 2.39999 |
| 508 | 4.322309 | 2.366392 | 558 | 5.460052 | 2.396757 |
| 509 | 4.351386 | 2.372449 | 559 | 5.478404 | 2.393416 |
| 510 | 4.380103 | 2.378198 | 560 | 5.496647 | 2.389971 |
| 511 | 4.408468 | 2.383645 | 561 | 5.514789 | 2.386422 |
| 512 | 4.436487 | 2.388796 | 562 | 5.532831 | 2.382772 |
| 513 | 4.464169 | 2.39366 | 563 | 5.550774 | 2.379023 |
| 514 | 4.491519 | 2.398241 | 564 | 5.568622 | 2.375175 |
| 515 | 4.518547 | 2.402546 | 565 | 5.586376 | 2.371232 |
| 516 | 4.545254 | 2.40658 | 566 | 5.604039 | 2.367194 |
| 517 | 4.571655 | 2.410352 | 567 | 5.621614 | 2.363063 |
| 518 | 4.597754 | 2.413866 | 568 | 5.639102 | 2.358841 |
| 519 | 4.623558 | 2.417128 | 569 | 5.656503 | 2.354529 |
| 520 | 4.649073 | 2.420143 | 570 | 5.673825 | 2.350128 |
| 521 | 4.674305 | 2.422918 | 571 | 5.691066 | 2.34564 |
| 522 | 4.699261 | 2.425457 | 572 | 5.70823 | 2.341067 |
| 523 | 4.723948 | 2.427766 | 573 | 5.725317 | 2.336409 |
| 524 | 4.748371 | 2.42985 | 574 | 5.74233 | 2.331667 |
| 525 | 4.772535 | 2.431714 | 575 | 5.759269 | 2.326844 |
| 526 | 4.796451 | 2.433364 | 576 | 5.776139 | 2.32194 |
| 527 | 4.820122 | 2.434803 | 577 | 5.792939 | 2.316957 |
| 528 | 4.843554 | 2.436038 | 578 | 5.809669 | 2.311895 |
| 529 | 4.866753 | 2.437071 | 579 | 5.826337 | 2.306756 |
| 530 | 4.889724 | 2.437909 | 580 | 5.84294 | 2.30154 |
| 531 | 4.912474 | 2.438554 | 581 | 5.859481 | 2.296249 |
| 532 | 4.935006 | 2.439012 | 582 | 5.87596 | 2.290884 |
| 533 | 4.957327 | 2.439287 | 583 | 5.89238 | 2.285446 |
| 534 | 4.97944 | 2.439382 | 584 | 5.908742 | 2.279935 |
| 535 | 5.001354 | 2.439302 | 585 | 5.925048 | 2.274353 |
| 536 | 5.023072 | 2.439051 | 586 | 5.941298 | 2.2687 |
| 537 | 5.044599 | 2.438632 | 587 | 5.957491 | 2.262978 |
| 538 | 5.065939 | 2.438049 | 588 | 5.973634 | 2.257187 |
| 539 | 5.087099 | 2.437305 | 589 | 5.989726 | 2.251328 |
| 540 | 5.10808 | 2.436404 | 590 | 6.005767 | 2.245401 |
| 541 | 5.128889 | 2.435349 | 591 | 6.02176 | 2.239408 |
| 542 | 5.14953 | 2.434144 | 592 | 6.037704 | 2.233349 |
| 543 | 5.170004 | 2.432792 | 593 | 6.053602 | 2.227224 |
| 544 | 5.19032 | 2.431296 | 594 | 6.069454 | 2.221037 |
| 545 | 5.210481 | 2.429659 | 595 | 6.085261 | 2.214786 |
| 546 | 5.230489 | 2.427883 | 596 | 6.101023 | 2.208472 |
| 547 | 5.25035 | 2.425972 | 597 | 6.116745 | 2.202095 |
| 548 | 5.270067 | 2.423929 | 598 | 6.132424 | 2.195656 |
| 549 | 5.289642 | 2.421755 | 599 | 6.148064 | 2.189156 |
| 550 | 5.309081 | 2.419455 | 600 | 6.163663 | 2.182596 |
| 601 | 6.179224 | 2.175975 | 608 | 6.287137 | 2.128 |
| 602 | 6.194747 | 2.169296 | 609 | 6.302419 | 2.120919 |
| 603 | 6.210233 | 2.162557 | 610 | 6.317669 | 2.113782 |
| 604 | 6.225683 | 2.15576 | 611 | 6.332889 | 2.10659 |
| 605 | 6.241096 | 2.148906 | 612 | 6.348078 | 2.099344 |
| 606 | 6.256476 | 2.141994 | 613 | 6.363239 | 2.092043 |
| 607 | 6.271823 | 2.135026 | 614 | 6.378368 | 2.084689 |
|  |  |  | 615 | 6.393473 | 2.077281 |

TABLE 2

Intensity Distribution

| | | | | |
|---|---|---|---|---|
| 106.373 | 106.683 | 106.062 | 106.683 | 106.3730 |
| 102.746 | 103.212 | 102.746 | 103.212 | 102.746 |
| 99.6373 | 100.155 | 99.6373 | 100.155 | 99.6373 |
| 100.414 | 100.829 | 100.518 | 100.829 | 100.414 |
| 99.8445 | 100.414 | 99.8963 | 100.414 | 99.84455 |
| 100.310 | 100.621 | 100.103 | 100.621 | 100.3108 |
| 100.310 | 100.621 | 100.518 | 100.621 | 100.311 |
| 99.4818 | 100 | 99.4818 | 100 | 99.4819 |
| 102.435 | 102.901 | 102.435 | 102.901 | 102.435 |
| 105.699 | 106.062 | 105.544 | 106.062 | 105.6994 |

TABLE 3

| Point # | X | Y | Point # | X | Y |
|---|---|---|---|---|---|
| 1 | −0.3940 | 0.0000 | 51 | −0.3263 | 0.2605 |
| 2 | −0.3935 | 0.0055 | 52 | 0.3238 | 0.2651 |
| 3 | −0.3934 | 0.0110 | 53 | −0.3214 | 0.2697 |
| 4 | −0.3933 | 0.0165 | 54 | −0.3188 | 0.2742 |
| 5 | −0.3931 | 0.0220 | 55 | −0.3163 | 0.2788 |
| 6 | −0.3928 | 0.0275 | 56 | −0.3137 | 0.2834 |
| 7 | −0.3925 | 0.0330 | 57 | −0.3110 | 0.2880 |
| 8 | −0.3921 | 0.0384 | 58 | −0.3083 | 0.2926 |
| 9 | −0.3916 | 0.0439 | 59 | −0.3056 | 0.2972 |
| 10 | −0.3911 | 0.0494 | 60 | −0.3023 | 0.3017 |
| 11 | −0.3906 | 0.0549 | 61 | −0.3000 | 0.3063 |
| 12 | −0.3899 | 0.0604 | 62 | −0.2971 | 0.3109 |
| 13 | −0.3892 | 0.0658 | 63 | −0.2942 | 0.3155 |
| 14 | −0.3885 | 0.0713 | 64 | −0.2912 | 0.3200 |
| 15 | −0.3377 | 0.0768 | 65 | −0.2882 | 0.3246 |
| 16 | −0.3869 | 0.0822 | 66 | −0.2851 | 0.3291 |
| 17 | −0.3859 | 0.0877 | 67 | −0.2820 | 0.3337 |
| 18 | −0.3850 | 0.0931 | 68 | −0.2788 | 0.3383 |
| 19 | −0.3839 | 0.0986 | 69 | −0.2756 | 0.3428 |
| 20 | −0.3828 | 0.1040 | 70 | −0.2724 | 0.3474 |
| 21 | −0.3817 | 0.1095 | 71 | −0.2691 | 0.3519 |
| 22 | −0.3805 | 0.1149 | 72 | −0.2657 | 0.3565 |
| 23 | −0.3792 | 0.1203 | 73 | −0.2623 | 0.3610 |
| 24 | −0.3779 | 0.1257 | 74 | −0.2589 | 0.3656 |
| 25 | −0.3766 | 0.1311 | 75 | −0.2553 | 0.3701 |
| 26 | −0.3751 | 0.1365 | 76 | −0.2518 | 0.3747 |
| 27 | −0.3736 | 0.1419 | 77 | −0.2482 | 0.3792 |
| 28 | −0.3721 | 0.1473 | 78 | −0.2450 | 0.3831 |
| 29 | −0.3705 | 0.1527 | 79 | −0.2419 | 0.3871 |
| 30 | −0.3689 | 0.1581 | 80 | −0.2386 | 0.3910 |
| 31 | −0.3672 | 0.1635 | 81 | −0.2354 | 0.3949 |
| 32 | −0.3654 | 0.1688 | 82 | −0.2321 | 0.3988 |
| 33 | −0.3636 | 0.1742 | 83 | −0.2288 | 0.4027 |
| 34 | −0.3617 | 0.1796 | 84 | −0.2254 | 0.4066 |
| 35 | −0.3593 | 0.1849 | 85 | −0.2220 | 0.4105 |
| 36 | −0.3578 | 0.1902 | 86 | −0.2185 | 0.4144 |
| 37 | −0.3558 | 0.1956 | 87 | −0.2150 | 0.4183 |
| 38 | −0.3539 | 0.2002 | 88 | −0.2115 | 0.4223 |
| 39 | −0.3521 | 0.2049 | 89 | −0.2079 | 0.4262 |
| 40 | −0.3501 | 0.2096 | 90 | −0.2042 | 0.4301 |
| 41 | −0.3482 | 0.2142 | 91 | −0.2006 | 0.4340 |
| 42 | −0.3462 | 0.2189 | 92 | −0.1968 | 0.4380 |
| 43 | −0.3441 | 0.2235 | 93 | −0.1931 | 0.4419 |
| 44 | −0.3421 | 0.2281 | 94 | −0.1892 | 0.4458 |
| 45 | −0.3399 | 0.2328 | 95 | −0.1854 | 0.4498 |
| 46 | −0.3378 | 0.2374 | 96 | −0.1815 | 0.4537 |
| 47 | −0.3356 | 0.2420 | 97 | −0.1775 | 0.4576 |
| 48 | −0.3333 | 0.2466 | 98 | −0.1735 | 0.4616 |
| 49 | −0.3310 | 0.2512 | 99 | −0.1695 | 0.4656 |
| 50 | −0.3287 | 0.2558 | 100 | −0.1654 | 0.4695 |
| 101 | −0.1612 | 0.4736 | 151 | 0.0412 | 0.6735 |
| 102 | −0.1570 | 0.4776 | 152 | 0.0450 | 0.6770 |
| 103 | −0.1528 | 0.4818 | 153 | 0.0488 | 0.6805 |
| 104 | −0.1486 | 0.4860 | 154 | 0.0526 | 0.6841 |
| 105 | −0.1450 | 0.4896 | 155 | 0.0565 | 0.6877 |
| 106 | −0.1414 | 0.4932 | 156 | 0.0605 | 0.6913 |
| 107 | −0.1378 | 0.4968 | 157 | 0.0645 | 0.6950 |
| 108 | −0.1341 | 0.5005 | 158 | 0.0685 | 0.6987 |
| 109 | −0.1304 | 0.5043 | 159 | 0.0726 | 0.7024 |

TABLE 3-continued

| Point # | X | Y | Point # | X | Y |
|---|---|---|---|---|---|
| 110 | −0.1267 | 0.5081 | 160 | 0.0767 | 0.7062 |
| 111 | −0.1229 | 0.5120 | 161 | 0.0809 | 0.7100 |
| 112 | −0.1191 | 0.5159 | 162 | 0.0851 | 0.7139 |
| 113 | −0.1152 | 0.5198 | 163 | 0.0894 | 0.7178 |
| 114 | −0.1113 | 0.5238 | 164 | 0.0937 | 0.7217 |
| 115 | −0.1074 | 0.5279 | 165 | 0.0981 | 0.7257 |
| 116 | −0.1034 | 0.5320 | 166 | 0.1025 | 0.7297 |
| 117 | −0.0994 | 0.5362 | 167 | 0.1070 | 0.7338 |
| 118 | −0.0953 | 0.5404 | 168 | 0.1116 | 0.7379 |
| 119 | −0.0911 | 0.5446 | 169 | 0.1162 | 0.7421 |
| 120 | −0.0870 | 0.5490 | 170 | 0.1209 | 0.7463 |
| 121 | −0.0827 | 0.5533 | 171 | 0.1256 | 0.7505 |
| 122 | −0.0784 | 0.5578 | 172 | 0.1304 | 0.7548 |
| 123 | −0.0740 | 0.5622 | 173 | 0.1352 | 0.7592 |
| 124 | −0.0705 | 0.5659 | 174 | 0.1401 | 0.7635 |
| 125 | −0.0669 | 0.5695 | 175 | 0.1451 | 0.7680 |
| 126 | −0.0633 | 0.5732 | 176 | 0.1501 | 0.7725 |
| 127 | −0.0596 | 0.5769 | 177 | 0.1552 | 0.7770 |
| 128 | −0.0559 | 0.5807 | 178 | −0.1604 | 0.7816 |
| 129 | −0.0522 | 0.5844 | 179 | 0.1657 | 0.7862 |
| 130 | −0.0484 | 0.5882 | 180 | 0.1710 | 0.7909 |
| 131 | −0.0445 | 0.5921 | 181 | 0.1764 | 0.7956 |
| 132 | −0.0406 | 0.5960 | 182 | 0.1818 | 0.8004 |
| 133 | −0.0367 | 0.5999 | 183 | 0.1874 | 0.8052 |
| 134 | −0.0327 | 0.6038 | 184 | 0.1930 | 0.8101 |
| 135 | −0.0287 | 0.6078 | 185 | 0.1963 | 0.8134 |
| 136 | −0.0246 | 0.6118 | 186 | 0.2006 | 0.8167 |
| 137 | −0.0204 | 0.6158 | 187 | 0.2045 | 0.8201 |
| 138 | −0.0162 | 0.6198 | 188 | 0.2083 | 0.8234 |
| 139 | −0.0120 | 0.6239 | 189 | 0.2123 | 0.8268 |
| 140 | −0.0077 | 0.6280 | 190 | 0.2162 | 0.8302 |
| 141 | −0.0033 | 0.6321 | 191 | 0.2203 | 0.8337 |
| 142 | 0.0011 | 0.6363 | 192 | 0.2243 | 0.8371 |
| 143 | 0.0056 | 0.6404 | 193 | 0.2284 | 0.8406 |
| 144 | 0.0101 | 0.6447 | 194 | 0.2325 | 0.8442 |
| 145 | 0.0147 | 0.6489 | 195 | 0.2367 | 0.8477 |
| 146 | 0.0194 | 0.6533 | 196 | 0.2409 | 0.8513 |
| 147 | 0.0241 | 0.6577 | 197 | 0.2451 | 0.8549 |
| 148 | 0.0289 | 0.6621 | 198 | 0.2494 | 0.8585 |
| 149 | 0.0338 | 0.6666 | 199 | 0.2537 | 0.8622 |
| 150 | 0.0375 | 0.6700 | 200 | 0.2581 | 0.8658 |
|  |  |  | 201 | 0.2625 | 0.8695 |
| 202 | 0.2670 | 0.8733 | 252 | 0.5612 | 1.1014 |
| 203 | 0.2715 | 0.8771 | 253 | 0.5688 | 1.1069 |
| 204 | 0.2760 | 0.8808 | 254 | 0.5766 | 1.1124 |
| 205 | 0.2806 | 0.8847 | 255 | 0.5844 | 1.1180 |
| 206 | 0.2853 | 0.8885 | 256 | 0.5924 | 1.1236 |
| 207 | 0.2899 | 0.8924 | 257 | 0.6004 | 1.1293 |
| 208 | 0.2947 | 0.8963 | 258 | 0.6085 | 1.1350 |
| 209 | 0.2995 | 0.9003 | 259 | 0.6167 | 1.1407 |
| 210 | 0.3043 | 0.9042 | 260 | 0.6209 | 1.1436 |
| 211 | 0.3092 | 0.9082 | 261 | 0.6250 | 1.1465 |
| 212 | 0.3141 | 0.9123 | 262 | 0.6292 | 1.1494 |
| 213 | 0.3191 | 0.9163 | 263 | 0.6334 | 1.1523 |
| 214 | 0.3241 | 0.9204 | 264 | 0.6377 | 1.1552 |
| 215 | 0.3292 | 0.9245 | 265 | 0.6419 | 1.1582 |
| 216 | 0.3343 | 0.9287 | 266 | 0.6462 | 1.1611 |
| 217 | 0.3395 | 0.9329 | 267 | 0.6505 | 1.1641 |
| 218 | 0.3448 | 0.9371 | 268 | 0.6549 | 1.1670 |
| 219 | 0.3501 | 0.9414 | 269 | 0.6592 | 1.1700 |
| 220 | 0.3554 | 0.9456 | 270 | 0.6636 | 1.1730 |
| 221 | 0.3608 | 0.9500 | 271 | 0.6680 | 1.1760 |
| 222 | 0.3663 | 0.9543 | 272 | 0.6725 | 1.1790 |
| 223 | 0.3718 | 0.9587 | 273 | 0.6769 | 1.1820 |
| 224 | 0.3774 | 0.9631 | 274 | 0.6814 | 1.1851 |
| 225 | 0.3831 | 0.9676 | 275 | 0.6859 | 1.1881 |
| 226 | 0.3888 | 0.9720 | 276 | 0.6905 | 1.1912 |
| 227 | 0.3945 | 0.9766 | 277 | 0.6950 | 1.1942 |
| 228 | 0.4004 | 0.9811 | 278 | 0.6996 | 1.1973 |
| 229 | 0.4063 | 0.9857 | 279 | 0.7042 | 1.2004 |
| 230 | 0.4122 | 0.9903 | 280 | 0.7089 | 1.2035 |
| 231 | 0.4182 | 0.9950 | 281 | 0.7136 | 1.2066 |
| 232 | 0.4243 | 0.9997 | 282 | 0.7183 | 1.2098 |
| 233 | 0.4305 | 1.0044 | 283 | 0.7230 | 1.2129 |
| 234 | 0.4367 | 1.0092 | 284 | 0.7278 | 1.2161 |
| 235 | 0.4430 | 1.0140 | 285 | 0.7326 | 1.2193 |
| 236 | 0.4493 | 1.0188 | 286 | 0.7374 | 1.2225 |
| 237 | 0.4558 | 1.0237 | 287 | 0.7423 | 1.2258 |
| 238 | 0.4622 | 1.0286 | 288 | 0.7472 | 1.2290 |
| 239 | 0.4688 | 1.0335 | 289 | 0.7522 | 1.2323 |
| 240 | 0.4755 | 1.0385 | 290 | 0.7571 | 1.2356 |
| 241 | 0.4822 | 1.0436 | 291 | 0.7621 | 1.2389 |
| 242 | 0.4890 | 1.0486 | 292 | 0.7672 | 1.2422 |
| 243 | 0.4958 | 1.0537 | 293 | 0.7722 | 1.2455 |
| 244 | 0.5028 | 1.0589 | 294 | 0.7773 | 1.2489 |
| 245 | 0.5098 | 1.0640 | 295 | 0.7825 | 1.2523 |
| 246 | 0.5169 | 1.0693 | 296 | 0.7877 | 1.2557 |
| 247 | 0.5240 | 1.0745 | 297 | 0.7929 | 1.2591 |
| 248 | 0.5313 | 1.0798 | 298 | 0.7981 | 1.2625 |
| 249 | 0.5386 | 1.0851 | 299 | 0.8034 | 1.2660 |
| 250 | 0.5461 | 1.0905 | 300 | 0.8087 | 1.2695 |
| 251 | 0.5536 | 1.0959 | 301 | 0.8141 | 1.2730 |
| 302 | 0.8195 | 1.2765 | 352 | 1.1455 | 1.4821 |
| 303 | 0.8249 | 1.2800 | 353 | 1.1533 | 1.4869 |
| 304 | 0.8304 | 1.2836 | 354 | 1.1612 | 1.4918 |
| 305 | 0.8359 | 1.2872 | 355 | 1.1692 | 1.4966 |
| 306 | 0.8414 | 1.2908 | 356 | 1.1773 | 1.5015 |
| 307 | 0.8470 | 1.2944 | 357 | 1.1854 | 1.5064 |
| 308 | 0.8526 | 1.2981 | 358 | 1.1935 | 1.5114 |
| 309 | 0.8583 | 1.3017 | 359 | 1.2018 | 1.5163 |
| 310 | 0.8640 | 1.3054 | 360 | 1.2101 | 1.5214 |
| 311 | 0.8697 | 1.3091 | 361 | 1.2184 | 1.5264 |
| 312 | 0.8755 | 1.3128 | 362 | 1.2269 | 1.5315 |
| 313 | 0.8813 | 1.3166 | 363 | 1.2354 | 1.5366 |
| 314 | 0.8872 | 1.3204 | 364 | 1.2440 | 1.5417 |
| 315 | 0.8931 | 1.3242 | 365 | 1.2526 | 1.5469 |
| 316 | 0.8991 | 1.3280 | 366 | 1.2613 | 1.5521 |
| 317 | 0.9051 | 1.3318 | 367 | 1.2701 | 1.5574 |
| 318 | 0.9111 | 1.3357 | 368 | 1.2789 | 1.5626 |
| 319 | 0.9172 | 1.3396 | 369 | 1.2879 | 1.5680 |
| 320 | 0.9233 | 1.3435 | 370 | 1.2969 | 1.5733 |
| 321 | 0.9295 | 1.3474 | 371 | 1.3059 | 1.5787 |
| 322 | 0.9357 | 1.3514 | 372 | 1.3151 | 1.5841 |
| 323 | 0.9420 | 1.3554 | 373 | 1.3243 | 1.5896 |
| 324 | 0.9483 | 1.3594 | 374 | 1.3336 | 1.5950 |
| 325 | 0.9546 | 1.3634 | 375 | 1.3430 | 1.6006 |
| 326 | 0.9610 | 1.3675 | 376 | 1.3524 | 1.6061 |
| 327 | 0.9675 | 1.3723 | 377 | 1.3620 | 1.6117 |
| 328 | 0.9740 | 1.3756 | 378 | 1.3716 | 1.6174 |
| 329 | 0.9805 | 1.3798 | 379 | 1.3813 | 1.6230 |
| 330 | 0.9871 | 1.3839 | 380 | 1.3910 | 1.6288 |
| 331 | 0.9937 | 1.3881 | 381 | 1.4009 | 1.6345 |
| 332 | 1.0004 | 1.3915 | 382 | 1.4108 | 1.6403 |
| 333 | 1.0072 | 1.3965 | 383 | 1.4208 | 1.6461 |
| 334 | 1.0140 | 1.4008 | 384 | 1.4309 | 1.6520 |
| 335 | 1.0208 | 1.4051 | 385 | 1.4411 | 1.6579 |
| 336 | 1.0277 | 1.4094 | 386 | 1.4514 | 1.6638 |
| 337 | 1.0346 | 1.4137 | 387 | 1.4618 | 1.6698 |
| 338 | 1.0416 | 1.4181 | 388 | 1.4722 | 1.6758 |
| 339 | 1.0487 | 1.4225 | 389 | 1.4827 | 1.6819 |
| 340 | 1.0558 | 1.4269 | 390 | 1.4934 | 1.6880 |
| 341 | 1.0630 | 1.4314 | 400 | 1.5041 | 1.6942 |
| 342 | 1.0702 | 1.4358 | 401 | 1.5149 | 1.7003 |
| 343 | 1.0775 | 1.4403 | 402 | 1.5258 | 1.7066 |
| 344 | 1.0848 | 1.4449 | 403 | 1.5368 | 1.7128 |
| 345 | 1.0922 | 1.4494 | 404 | 1.5479 | 1.7192 |
| 346 | 1.0996 | 1.4540 | 405 | 1.5591 | 1.7255 |
| 347 | 1.1071 | 1.4586 | 406 | 1.5703 | 1.7319 |
| 348 | 1.1147 | 1.4633 | 407 | 1.5817 | 1.7384 |
| 349 | 1.1223 | 1.4679 | 408 | 1.5932 | 1.7448 |
| 350 | 1.1299 | 1.4726 | 409 | 1.6048 | 1.7514 |
| 351 | 1.4377 | 1.4774 | 410 | 1.6165 | 1.7579 |
|  |  |  | 411 | 1.6282 | 1.7646 |
| 412 | 1.6401 | 1.7712 | 461 | 2.3742 | 2.1604 |
| 413 | 1.6521 | 1.7779 | 462 | 2.3929 | 2.1698 |
| 414 | 1.6642 | 1.7847 | 463 | 2.4117 | 2.1792 |
| 415 | 1.6764 | 1.7915 | 464 | 2.4308 | 2.1887 |
| 416 | 1.6887 | 1.7983 | 465 | 2.4500 | 2.1983 |
| 417 | 1.7011 | 1.8052 | 466 | 2.4693 | 2.2079 |
| 418 | 1.7136 | 1.8122 | 467 | 2.4889 | 2.2176 |
| 419 | 1.7263 | 1.8192 | 468 | 2.5087 | 2.2273 |
| 420 | 1.7390 | 1.8262 | 469 | 2.5286 | 2.2372 |
| 421 | 1.7519 | 1.8333 | 470 | 2.5487 | 2.2470 |
| 422 | 1.7649 | 1.8404 | 471 | 2.5690 | 2.2570 |

TABLE 3-continued

| Point # | X | Y | Point # | X | Y |
|---|---|---|---|---|---|
| 423 | 1.7779 | 1.8476 | 472 | 2.5895 | 2.2670 |
| 424 | 1.7911 | 1.8549 | 473 | 2.6102 | 2.2771 |
| 425 | 1.8045 | 1.8621 | 474 | 2.6311 | 2.2872 |
| 426 | 1.8179 | 1.8695 | 475 | 2.6521 | 2.2974 |
| 427 | 1.8315 | 1.8769 | 476 | 2.6734 | 2.3077 |
| 428 | 1.8452 | 1.8843 | 477 | 2.6949 | 2.3180 |
| 429 | 1.8590 | 1.8918 | 478 | 2.7165 | 2.3284 |
| 430 | 1.8729 | 1.8993 | 479 | 2.7384 | 2.3389 |
| 431 | 1.8870 | 1.9069 | 480 | 2.7605 | 2.3494 |
| 432 | 1.9012 | 1.9145 | 481 | 2.7872 | 2.3600 |
| 433 | 1.9155 | 1.9222 | 482 | 2.8054 | 2.3707 |
| 434 | 1.9299 | 1.9300 | 483 | 2.8279 | 2.3184 |
| 435 | 1.9445 | 1.9378 | 484 | 2.8508 | 2.3922 |
| 436 | 1.9592 | 1.9456 | 485 | 2.8704 | 2.4031 |
| 437 | 1.9740 | 1.9535 | 486 | 2.8973 | 2.4140 |
| 438 | 1.9890 | 1.9615 | 487 | 2.9208 | 2.4250 |
| 439 | 2.0041 | 1.9695 | 488 | 2.9446 | 2.4360 |
| 440 | 2.0194 | 1.9776 | 489 | 2.9686 | 2.4472 |
| 441 | 2.0348 | 1.9857 | 490 | 2.9928 | 2.4584 |
| 442 | 2.0503 | 1.9939 | 491 | 3.0172 | 2.4696 |
| 443 | 2.0660 | 2.0021 | 492 | 3.0419 | 2.4809 |
| 444 | 2.0818 | 2.0140 | 493 | 3.0668 | 2.4923 |
| 445 | 2.0978 | 2.0188 | 494 | 3.0919 | 2.5038 |
| 446 | 2.1139 | 2.0272 | 495 | 3.1172 | 2.5153 |
| 447 | 2.1301 | 2.0357 | 496 | 3.1428 | 2.5269 |
| 448 | 2.1465 | 2.0442 | 497 | 3.1686 | 2.5386 |
| 449 | 2.1631 | 2.0528 | 498 | 3.1946 | 2.5503 |
| 450 | 2.1798 | 2.0614 | 499 | 3.2209 | 2.5621 |
| 451 | 2.1967 | 2.0701 | 500 | 3.2474 | 2.5739 |
| 452 | 2.2137 | 2.0789 | 501 | 3.2741 | 2.5858 |
| 453 | 2.2309 | 2.0877 | 502 | 3.3011 | 2.5978 |
| 454 | 2.2482 | 2.0966 | 503 | 3.3284 | 2.6098 |
| 455 | 2.2657 | 2.1055 | 504 | 3.3558 | 2.6219 |
| 456 | 2.2834 | 2.1145 | 505 | 3.3836 | 2.6341 |
| 457 | 2.3012 | 2.1236 | 506 | 3.4115 | 2.6463 |
| 458 | 2.3192 | 2.1327 | 507 | 3.4397 | 2.6586 |
| 459 | 2.3374 | 2.1419 | 508 | 3.4682 | 2.6709 |
| 460 | 2.3557 | 2.1511 | 509 | 3.4969 | 2.6833 |
|  |  |  | 510 | 3.5259 | 2.6958 |
|  |  |  | 511 | 3.5551 | 2.7083 |
| 512 | 3.5845 | 2.7209 | 562 | 5.3772 | 3.3862 |
| 513 | 3.6143 | 2.7335 | 563 | 5.4185 | 3.3991 |
| 514 | 3.6442 | 2.7462 | 564 | 5.4600 | 3.4118 |
| 515 | 3.6745 | 2.7589 | 565 | 5.5017 | 3.4245 |
| 516 | 3.7049 | 2.7717 | 566 | 5.5435 | 3.4371 |
| 517 | 3.7357 | 2.7845 | 567 | 5.5853 | 3.4496 |
| 518 | 3.7667 | 2.7974 | 568 | 5.6273 | 3.4620 |
| 519 | 3.7980 | 2.8104 | 569 | 5.6694 | 3.4742 |
| 520 | 3.8295 | 2.8234 | 570 | 5.7116 | 3.4864 |
| 521 | 3.8613 | 2.8364 | 571 | 5.7538 | 3.4984 |
| 522 | 3.8933 | 2.8495 | 572 | 5.7961 | 3.5103 |
| 523 | 3.9256 | 2.8626 | 573 | 5.8385 | 3.5220 |
| 524 | 3.9581 | 2.8758 | 574 | 5.8809 | 3.5336 |

TABLE 3-continued

| Point # | X | Y | Point # | X | Y |
|---|---|---|---|---|---|
| 525 | 3.9910 | 2.8890 | 575 | 5.9234 | 3.5451 |
| 526 | 4.0241 | 2.9023 | 576 | 5.9658 | 3.5564 |
| 527 | 4.0574 | 2.9156 | 577 | 6.0083 | 3.5675 |
| 528 | 4.0910 | 2.9289 | 578 | 6.0508 | 3.5785 |
| 529 | 4.1249 | 2.9423 | 579 | 6.0933 | 3.5892 |
| 530 | 4.1590 | 2.9557 | 580 | 6.1357 | 3.59984 |
| 531 | 4.1934 | 2.9691 | 581 | 6.1782 | 3.6102 |
| 532 | 4.2280 | 2.9862 | 582 | 6.2205 | 3.6204 |
| 533 | 4.2629 | 2.9961 | 583 | 6.2628 | 3.6305 |
| 534 | 4.2980 | 3.0096 | 584 | 6.3051 | 3.6402 |
| 535 | 4.3335 | 3.0231 | 585 | 6.3472 | 3.6498 |
| 536 | 4.3691 | 3.0367 | 586 | 6.3892 | 3.6592 |
| 537 | 4.4050 | 3.0502 | 587 | 6.4312 | 3.6683 |
| 538 | 4.4412 | 3.0638 | 588 | 6.4729 | 3.6858 |
| 539 | 4.5143 | 6.0910 | 589 | 6.5560 | 3.6941 |
| 540 | 4.5512 | 3.1046 | 590 | 6.5973 | 3.7022 |
| 541 | 4.5883 | 3.1183 | 591 | 6.6384 | 3.7101 |
| 542 | 4.6257 | 3.1319 | 592 | 6.6792 | 3.7176 |
| 543 | 4.6633 | 3.1455 | 593 | 6.7199 | 3.7249 |
| 544 | 4.7012 | 3.1591 | 594 | 6.7603 | 3.7319 |
| 545 | 4.7393 | 3.1727 | 595 | 6.8004 | 3.7385 |
| 546 | 4.7776 | 3.1863 | 596 | 6.8402 | 3.7449 |
| 547 | 4.8162 | 3.1999 | 597 | 6.8798 | 3.7510 |
| 548 | 4.8550 | 3.2135 | 598 | 6.9190 | 3.7567 |
| 549 | 4.8939 | 3.2270 | 599 | 6.9579 | 3.7621 |
| 550 | 4.9332 | 3.2405 | 600 | 6.9964 | 3.7672 |
| 551 | 4.9726 | 3.2540 | 601 | 7.0346 | 3.7719 |
| 552 | 5.0122 | 3.2674 | 602 | 7.0724 | 3.7763 |
| 553 | 5.0520 | 3.2808 | 603 | 7.1098 | 3.7803 |
| 554 | 5.0920 | 3.2942 | 604 | 7.1467 | 3.7840 |
| 5S5 | 5.1322 | 3.2942 | 605 | 7.1467 | 3.7840 |
| 556 | 5.1322 | 3.3075 | 606 | 7.1833 | 3.7873 |
| 557 | 5.1726 | 3.3208 | 607 | 7.2193 | 3.7902 |
| 558 | 5.2132 | 3.3340 | 608 | 7.2549 | 3.7928 |
| 559 | 5.2540 | 3.3472 | 609 | 7.2900 | 3.7949 |
| 560 | 5.2949 | 3.3602 | 610 | 7.3246 | 3.7967 |
| 561 | 5.3359 | 3.3733 | 611 | 7.3586 | 3.7981 |
|  |  |  | 612 | 7.3921 | 3.7990 |
|  |  |  | 613 | 7.4251 | 3.7996 |
|  |  |  | 614 | 7.4574 | 3.7997 |

TABLE 4

Intensity distribution

| 93.3 | 94.5 | 95.5 | 96.2 | 96.6 | 97.1 | 96.6 | 96.2 | 95.5 | 94.5 | 93.3 |
|---|---|---|---|---|---|---|---|---|---|---|
| 93.5 | 95.3 | 96.4 | 96.8 | 97.9 | 97.9 | 97.9 | 96.8 | 96.4 | 95.3 | 93.5 |
| 94.7 | 96.2 | 97.1 | 97.9 | 98.6 | 98.9 | 98.6 | 97.9 | 97.1 | 96.2 | 94.7 |
| 95.8 | 97.2 | 98.3 | 99.2 | 100.1 | 100.2 | 100.1 | 99.2 | 98.3 | 97.2 | 95.8 |
| 95.8 | 97.35 | 98.8 | 99.6 | 100 | 100.4 | 100 | 99.6 | 98.8 | 97.35 | 95.8 |
| 94.6 | 96.3 | 97.6 | 98.1 | 98.9 | 99.3 | 98.9 | 98.1 | 97.6 | 96.3 | 94.6 |
| 95.4 | 97.1 | 98.3 | 99.2 | 100 | 100.4 | 100 | 99.2 | 98.3 | 97.1 | 95.4 |
| 96.2 | 97.9 | 99 | 99.6 | 100.4 | 100.7 | 100.4 | 99.6 | 99 | 97.9 | 96.2 |
| 95.9 | 97.7 | 98.6 | 99.3 | 100.2 | 100.7 | 100.2 | 99.3 | 98.6 | 97.7 | 95.9 |
| 95.9 | 97.7 | 98.6 | 99.3 | 100 | 100.6 | 100 | 99.3 | 98.6 | 97.7 | 95.9 |
| 96.1 | 97.8 | 99 | 99.6 | 100.4 | 100.9 | 100.4 | 99.6 | 99 | 97.8 | 96.1 |
| 95.4 | 97.1 | 98.3 | 99.2 | 100 | 100.4 | 100 | 99.2 | 98.3 | 97.1 | 95.4 |
| 94.1 | 95.8 | 97.1 | 97.5 | 98.3 | 98.8 | 98.3 | 97.5 | 97.1 | 95.8 | 94.1 |
| 95.5 | 97.2 | 98.6 | 99.2 | 99.7 | 100.2 | 99.7 | 99.2 | 98.6 | 97.2 | 95.5 |
| 95.9 | 97.5 | 98.8 | 99.6 | 100.4 | 100.4 | 100.4 | 99.6 | 98.8 | 97.5 | 95.9 |
| 94.8 | 96.2 | 97.1 | 97.9 | 98.8 | 99 | 98.8 | 97.9 | 97.1 | 96.2 | 94.8 |

TABLE 4-continued

| Intensity distribution | | | | | | | | | | |
|---|---|---|---|---|---|---|---|---|---|---|
| 93.3 | 95.1 | 96.2 | 96.6 | 97.5 | 97.6 | 97.5 | 96.6 | 96.2 | 95.1 | 93.3 |
| 93.7 | 95 | 95.9 | 96.6 | 97.1 | 97.5 | 97.1 | 96.6 | 95.9 | 95 | 93.7 |

A FLASH-LAMP DEVICE

The above described reflectors can be advantageously used in flash light printing devices, such as the devices used to manufacture color filter arrays. One such device is described below.

Figure 1:
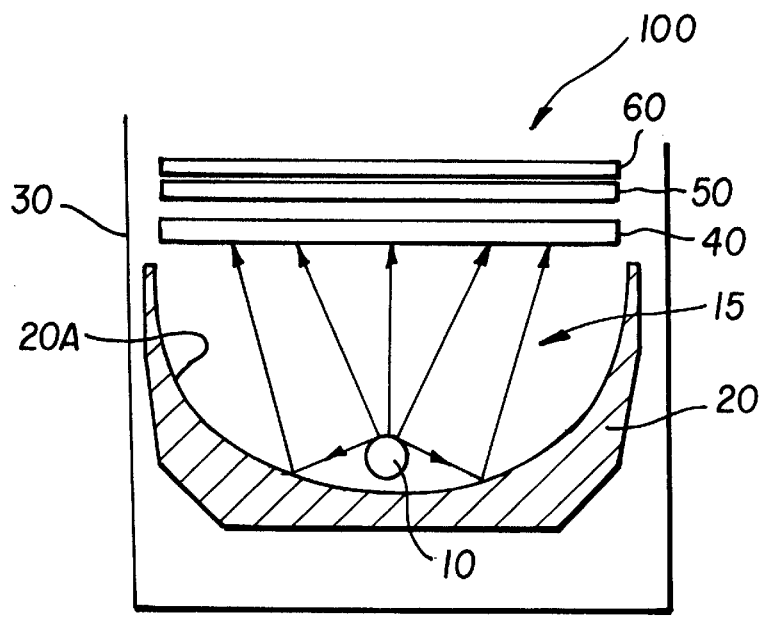
FIG. 1 shows a schematic cross-section of the flash device 100.

With reference to the accompanying FIG. 1 a flash device 100 incorporating one of the above reflectors 20 also comprises a high energy source such as a flash lamp 10, both located within a casing body 30. The reflector 20 directs the light energy (schematically depicted as light rays 15) flashed by the flash lamp 10 towards a micro-optics array 40. This micro-optics array 40 focuses the light, and as a result produces concentrations of energy 55 on or in the vicinity of a dye carrier 50 which includes a radiation-absorbing dye. The dye carrier 50 is supported in its location by a support structure 51. This is shown schematically in FIG. 2. These concentrations of energy cause the dye to transfer from the radiation-absorbing dye carrier 50 to the receiver element 60. The flash device, such as the device 100, may also include other conventional features associated with known flash devices including those used in production of color filter arrays.

According to the preferred embodiment, the flash lamp 10 delivers approximately a minimum of 0.5–1.5 joules of radiant energy per flash in approximately 600–700 milliseconds. This radiant energy is visible, near UV (ultra violet) and near IR. (infra-red) light. The example illustrated in FIG. 1 utilizes a six inch long xenon tube flash lamp such as the one described by the tube number N.188c, which is commercially available from Xenon Corporation (Woburn, Mass.). Similar flash lamps are also available from other manufacturers, for example, EG&G Electro Optics (Salem, Mass.).

As stated above the reflector 20 directs the light from the flash lamp 10 towards the micro-optics array 40 which is being used instead of a mask. In this embodiment the reflector 20 has a reflective, curved (roughly cylindrical) inner walls 20A which are polished aluminum. However, other highly reflective materials may also be used. According to one embodiment of the present invention the inner walls 20A are concave and have the improved egg-like shaped cross-section depicted in FIG. 5B. This shape provides a uniform (within 10%) illumination of a micro-optics array 40. This cross-section shape is further described in the "The Reflector Shape" section of this application.

According to another reflector embodiment, the reflector 20 has inner walls 20A with the improved cross-section 24' depicted in FIG. 6. This shape provides even higher illumination uniformity than that of FIG. 5B. This alternative cross-sectional shape is also described in the "The Reflector Shape" section of this application.

A micro-optics array is an integral array of very small optical elements which are commonly supported. It is preferred that each of these small optical elements have a clear aperture that is smaller than about 1 mm. It is even more preferred that these clear aperture be smaller than 0.5 mm.

Figure 2:
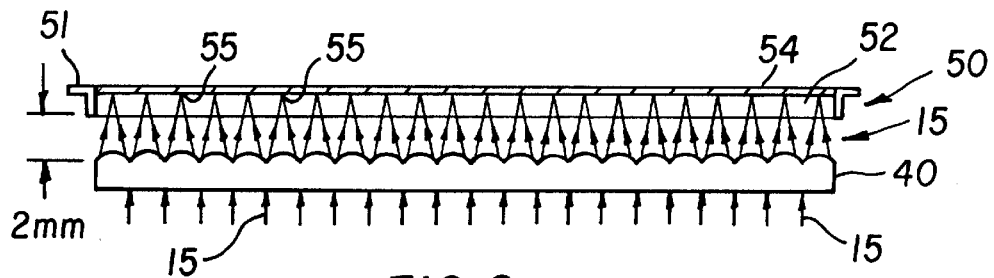
FIG. 2 shows a schematic cross-section of a part of a micro-optics array 40 of FIG. 1 imaging on a dye carrier 50.
Figure 4:
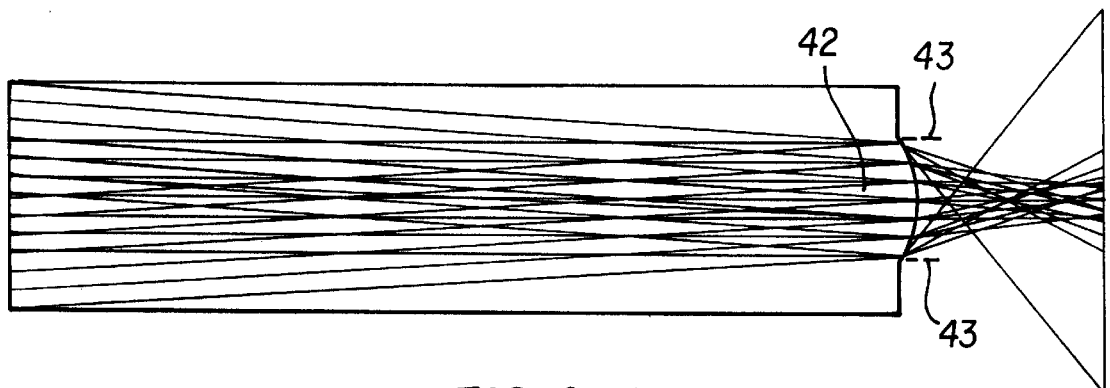
FIG. 4 shows an enlarged view of a lens element 42 of the micro-optics array illustrated in FIG. 2.
Figure 3:
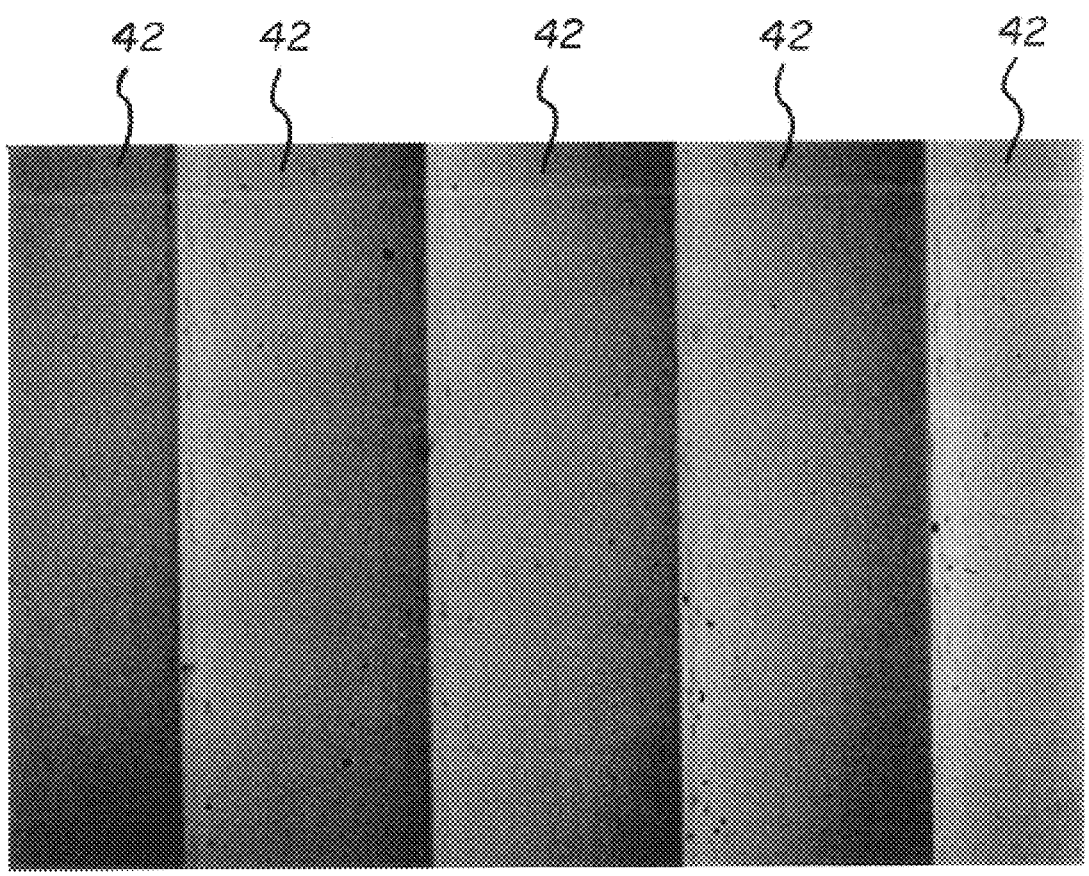
FIG. 3 shows an enlarged photograph of a part of a lenticular lenslet array which can be used as the micro-optic array 40.

According to the illustrative embodiment of the present invention, the micro-optics array 40 is a lenslet array. This array is illustrated in FIGS. 2 and 3. More specifically, it is an array of very small refractive lens elements 42. Each of these lens elements have a clear aperture 43 of about 180 μm. Each of these lens elements focuses the light onto or near the dye holding layer 50, thereby concentrating light energy into a plurality of areas, spots or lines, on the layer 50. The focal points for the lens elements define a plane either coextensive with or in the vicinity of the dye carrier.

FIG. 3 shows that in this embodiment the micro-optics array 40 is a lenticular lenslet array—i.e., that lens elements 42 are roughly cylindrical. This lenticular lenslet array has a pitch of approximately 180 microns.

If there is a need to create concentrations of energy 55 in a form of discrete spots rather than lines, the lens elements may have other shapes (such as circular, rectangular or hexagonal, for example). It is also contemplated that if a lenslet array is used, it may be an array of either diffractive lens elements or an array of lens elements having both a refractive power and a diffractive power. The use of other types of micro-optics arrays is also contemplated by this invention.

The use of the micro-optics array eliminates the need for a mask in the flash device systems as well as the problems associated with mask use. For example, while the opaque portion of a mask absorbs about ½ energy incident on the mask, the micro-optics array redistributes most of the total energy incident on it, making the thermal dye transfer method much more energy efficient. In addition, because no mask is required, the problem of mask abrasion, which is sometimes occurs because the mask is located close to the radiation-absorbing dye carrier, is also eliminated.

As stated above, the micro-optics array 40 is located near the radiation-absorbing dye carrier 50. In a particular embodiment of the invention, the separation between the micro-optic array 40 and the dye carrier 50 is approximately 0.2 millimeter. In this embodiment the dye carrier 50 comprises a support layer 52 which is approximately 0.001–0.005 inches thick and a dye holding layer 54. The dye holding layer 54 is a carbon film layer containing a dye. It is preferred that the micro-optic array 40 focus the light directly on this dye holding layer 54.

The receiver element 60 is positioned behind the dye carrier 50. The receiver element 60 is usually formed of glass or an optical quality plastic and has a polymer image receiving layer.

As stated above, the light resulted from the light flash is focused and thus is concentrated according to a predetermined pattern (into spots or lines, for example) by the micro-optics array near or on the dye carrier 50 and more preferable on the dye holding layer 54. This heats the dye holding layer 54 and causes the dye to sublime onto a receiver element 60. (If the dye holding layer 54 is a carbon film layer, the carbon can be heated (by the flash lamps described above) almost instantaneously to about 200–300 degrees Fahrenheit. The dye sublimes and then immediately deposits onto an aligned portion of the receiving element.)

In one embodiment of the present invention, the repeating mosaic pattern of colorant to form the color filter array consists of uniform repeated as follows:

| | | | | | | | | |
|---|---|---|---|---|---|---|---|---|
| B | R | G | B | R | G | B | R | G |
| B | R | G | B | R | G | B | R | G |
| B | R | G | B | R | G | B | R | G |
| B | R | G | B | R | G | B | R | G |
| B | R | G | B | R | G | B | R | G | where B stands for the blue, R for the red and G for the green color. The width of the lines is approximately 50 to 200 microns (0.002"–0.008"). Because typical color filter arrays have a pattern of 3 colors, the above described flash device will probably be used three times—i.e. the thermal transfer will be done once for each color that needs to be deposited on the receiver element. To achieve this transfer, a new dye carrier will be substituted for the one that was previously used (the one that contains a different color dye) and a flash lamp will be activated to provide the energy needed to transfer the dye to the receiver element.

Each color dye has to be fused to the receiver element. This can be done by various well known methods, such as by heat, or by solvent fusing and subsequent baking, for example.

Figure 1A:
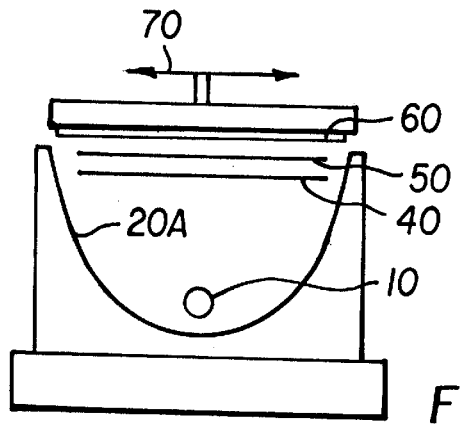
FIG. 1A shows schematically a relative movement of the receiver element 60 with respect to the flash device 100 via the use of a positioning system 70.
Figure 1B:
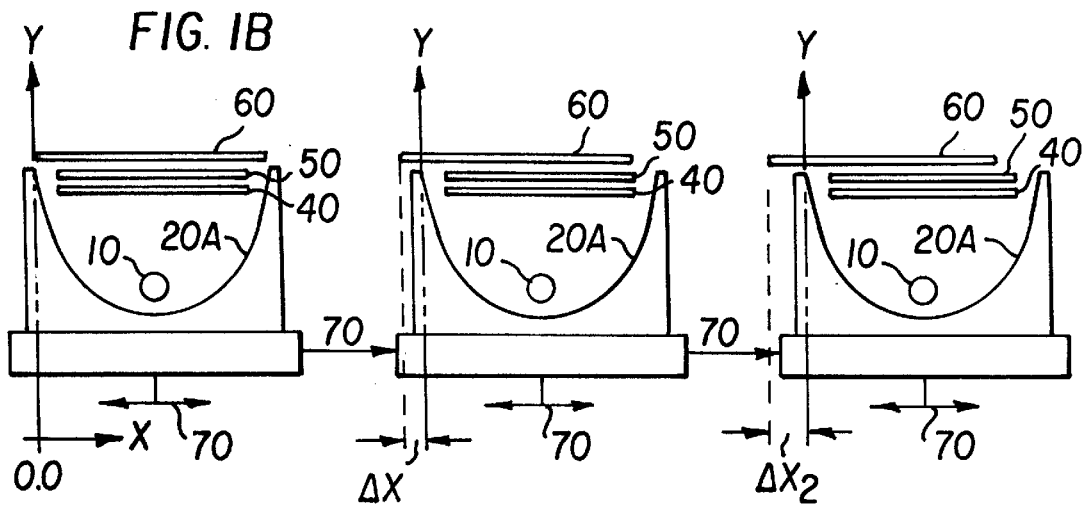
FIG. 1B shows schematically a greatly exaggerated movement of the flash device 100 via the use of a positioning system 70.

In order to align different color stripes on the receiver element either the lenslet array and/or the receiving element needs to be moved by an appropriate distance. This is done if one does not want to overlap different color dyes on the receiver element. It is preferred that the receiver element 60 be moved with respect to the micro-optics array or with respect to the whole flash device before depositing a dye of a different color on the receiving element. In order to deposit three different color dyes, this movement will have to be accomplished at least two times. Thus, the preferred embodiment of the present invention also incorporates a positioning system 70. Suitable positioning systems for microfabrication are well known. Prior to transferring an additional color dye onto the receiver element, the positioning system 70 positions and holds the receiver element 60 in a different position from its previous position. (See FIG. 1A.) Alternatively, a flash device 100 may be moved relative to the receiver element (by a distance Δx, Δx2), as shown in FIG. 1B. The positioning system 70 is indicated by arrows in FIGS. 1A and 1B. The positioning system may be used to reposition and hold the micro-optic array instead of repositioning either the receiver element or the entire flash device.

Once all color dyes are in place, an overcoat layer may be applied to the resultant filter array.

The invention has been described in detail with particular reference to the preferred embodiment, but it will be understood that variations and modifications can be effected within the spirit and scope of the invention. It is noted that the flash device described herein could be used in other applications and that the color filter arrays can be used in applications other than liquid crystal displays.

What is claimed is:

1. A reflector/light source system for illumination of an associated target surface located in front of said reflector/light source system, said reflector/light source system comprising:
(i) a light source providing light defined as light rays;
(ii) a reflector directing the light rays from said light source towards the associated target surface, said reflector including one closed end, one open end, and reflective curving interior walls, said walls being symmetrical about at least one axis of symmetry, said walls including a first segment and other segments,
(a) said first segment having a curved shape and being located at the closed end of said reflector, said first segment directing most of the light rays incident on said first segment across said axis of symmetry at crossover points, prior to said light rays striking the associated target surface, and (1) most of the light rays striking the walls of said first segment near the closed end of the reflector are having crossover points near said light source and (2) most of the light rays striking the walls of said first segment progressively further away from the closed end of the reflector are having crossover points located progressively closer to the associated target surface; and
(b) said other segments directing nearly all of the light rays incident on the walls of said other segments towards a portion of the associated target surface,
the portion of the associated target surface being located on a side of the axis of symmetry where the light rays are incident on said walls of said other segments,
such that nearly all of the light rays reflected off the walls of said other segments are not directed towards the axis of symmetry.

2. A reflector/light source system according to claim 1, wherein said reflective curving walls have at least one transition zone between said first segment and an adjacent one of said other segments, said transition zone reflecting the light rays which will intersect the axis of symmetry in a space between the light source and the associated target surface.

3. A reflector/light source system according to claim 1, wherein said light source is a flash lamp.

4. A flash device for transferring dye particles from a radiation-absorbing dye carrier to a receiver element located at a predetermined distance from the flash device, said flash device comprising:
(i) a flash lamp providing light, defined as light rays, in a flash of light;
(ii) a reflector directing the light from said flash towards the receiver element, said reflector including one closed end, one open end, and highly reflective curving interior walls, said walls being symmetrical about at least one axis of symmetry, said walls including a first segment and other segments,
said first segment having a curved shape and being located at the closed end of said reflector, said first segment directing most of the light rays incident on said first segment across said axis of symmetry at crossover points, prior to said light rays striking the associated target surface, and (1) most of the light rays striking the walls of said first segment near the closed end of the reflector are having crossover points near said light source and (2) most of the light rays striking the walls of said first segment progressively further away from the closed end of the reflector are having crossover points located progressively closer to the associated target surface; and
said other segments directing nearly all of the light rays incident on the walls of said other segments towards a portion of the associated target surface, the portion of the associated target surface being located on a side of the axis of symmetry where the light rays are incident on said walls of said other segments,
such that the light rays reflected off the walls of said other segments are not crossing the axis of symmetry;
(iii) a support means for supporting the radiation-absorbing dye carrier between said reflector and the receiver element; and
(iv) a micro-optics array located between said reflector and the radiation-absorbing dye carrier concentrating the light directed by said reflector on the radiation-absorbing dye carrier wherein said micro-optics array is an array of miniature lens elements.

5. A reflector for use with an associated flash lamp for illumination of an associated target surface located in front of said reflector, said reflector having at least one axis of symmetry and a widest part defined by maximum width, said reflector comprising:

reflective inner walls having a curvature that in a cross section includes a vertex, said curvature having a cross sectional shape which (1) is partially contained within a portion of an ellipse so that (a) a minor axis of the ellipse is equal to the maximum width between the inner walls and (b) a semi-major axis of the ellipse is equal to the vertex to maximum width distance; and (2) from a vertex to a point proximate the widest part of the reflector, the cross sectional shape is broader than a parabola, the parabola being defined by, (a) a vertex point which is being the vertex point of the reflective inner walls; and (b) symmetric points A, points A being defined by an intersection of a plane with the reflective inner walls, said plane being perpendicular to the axis of symmetry, and intersecting a center of the associated flash lamp.

6. A reflector/light source system for illumination of an associated target surface located in front of said reflector/light source system, said reflector/light source system comprising:

(i) a light source providing light defined as light rays;

(ii) a reflector directing the light rays from said light source towards the associated target surface, said reflector including one closed end, one open end, and a widest part defined by maximum width, and highly reflective curving walls, said curving walls being symmetrical about at least one axis of symmetry, said curving walls including a first segment and other segments, (a) said first segment having a curved shape and being located at the closed end of said reflector, said first segment directing most of the light rays incident on said first segment across said axis of symmetry at crossover points, prior to said light rays striking the associated target surface, and (1) most of the light rays striking the walls of said first segment near the closed end of the reflector are having crossover points near said light source and (2) most of the light rays striking the walls of said first segment progressively further away from the closed end of the reflector are having crossover points located progressively closer to the target surface;

(b) said other segments directing nearly all of the light rays incident on the walls of said other segments towards a portion of the associated target surface located on the side of the axis of symmetry where the light rays are incident on said walls of said other segments, thereby not crossing the axis of symmetry; and said reflective walls having a curvature that in cross section includes a vertex, said curvature having a cross sectional shape which (1) is partially contained within a portion of an ellipse is so that (aa) a minor axis of the ellipse is equal to the maximum width between the reflector walls and (bb) a semi-major axis of the ellipse is equal to the vertex-to maximum width distance; and (2) from a vertex to a point proximate the widest part of the reflector, the cross sectional shape is broader than a parabola, the parabola defined by (aa) a vertex point which is the vertex point of the reflective walls and (bb) symmetric points A, points A being defined by an intersection of a plane with the reflective walls, said plane being perpendicular to the axis of symmetry, and intersecting a center of the light source.

7. A reflector/light source system for illumination of an associated target surface located in front of said reflector/light source system, said reflector/light source system comprising:

(i) a light source providing light defined as light rays;

(ii) a reflector directing the light rays from said light source towards the associated target surface, said reflector including one closed end, one open end, and reflective curving interior walls, said walls being symmetrical about at least one axis of symmetry, said walls including a first segment and other segments, (a) said first segment having a curved shape and being located at the closed end of said reflector, said first segment directing most of the light rays incident on said first segment across said axis of symmetry at crossover points , prior to said light rays striking the associated target surface, and (1) most of the light rays striking the walls of said first segment near the closed end of the reflector are having crossover points near said light source, (2) most of the light rays striking the walls of said first segment progressively further away from the closed end of the reflector are having crossover points located progressively closer to the associated target surface, and (3) most of said light rays striking the walls of said first segment do not strike the walls of said other segments; and (b) said other segments directing nearly all of the light rays incident on the walls of said other segments towards a portion of the associated target surface, the portion of the associated target surface being located on a side of the axis of symmetry where the light rays are incident on said walls of said other segments, such that the light rays reflected off the walls of said other segments are not crossing the axis of symmetry.

8. A reflector/light source system according to claim 7, wherein said light source is a flash lamp.

9. A flash device for transferring dye particles from a radiation-absorbing dye carrier to a receiver element located at a predetermined distance from the flash device, said flash device comprising:

(i) a flash lamp providing light, defined as light rays, in a flash of light;

(ii) a reflector directing the light from said flash towards the receiver element, said reflector including one closed end, one open end, and highly reflective curving interior walls, said walls being symmetrical about at least one axis of symmetry, said walls including a first segment and other segments, said first segment having a curved shape and being located at the closed end of said reflector, said first segment directing most of the light rays incident on said first segment across said axis of symmetry at crossover points, prior to said light rays striking the associated target surface, and (1) most of the light rays striking the walls of said first segment are directed to cross said axis of symmetry between said light source and said open end of said reflector; (2) most of the light rays striking the walls of said first segment near the closed end of the reflector are having crossover points near said light source; and (3) most of the light rays striking the walls of said first segment progressively further away from the closed end of the reflector are having crossover points located progressively closer to the associated target surface; and said other segments directing nearly all of the light rays incident on the walls of said other segments towards a portion of the associated target surface, the portion of the associated target surface being located on a side of the axis of symmetry where the light rays are incident on said walls of said other segments, such that the light rays reflected off the walls of said other segments are not crossing the axis of symmetry;

(iii) a support means for supporting the radiation-absorbing dye carrier between said reflector and the receiver element; and (iv) a micro-optics array located between said reflector and the radiation-absorbing dye carrier concentrating the light directed by said reflector on the radiation-absorbing dye carrier wherein said micro-optics array is an array of miniature lens elements.

\* \* \* \* \*